United States Patent
Jung et al.

(10) Patent No.: US 9,432,870 B2
(45) Date of Patent: Aug. 30, 2016

(54) METHOD FOR EVALUATING CORRELATION VALIDITY BETWEEN ESTIMATION RESULT AND LOCATION INFORMATION IN WIRELESS COMMUNICATION SYSTEM, AND APPARATUS SUPPORTING SAME

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Jaewook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 14/399,857

(22) PCT Filed: May 9, 2013

(86) PCT No.: PCT/KR2013/004098
§ 371 (c)(1),
(2) Date: Nov. 7, 2014

(87) PCT Pub. No.: WO2013/169039
PCT Pub. Date: Nov. 14, 2013

(65) Prior Publication Data
US 2015/0133151 A1    May 14, 2015

Related U.S. Application Data

(60) Provisional application No. 61/645,023, filed on May 9, 2012.

(51) Int. Cl.
*H04W 24/10* (2009.01)
*H04W 24/02* (2009.01)
*H04W 64/00* (2009.01)

(52) U.S. Cl.
CPC ............. *H04W 24/10* (2013.01); *H04W 24/02* (2013.01); *H04W 64/00* (2013.01); *H04W 64/006* (2013.01)

(58) Field of Classification Search
CPC . H04W 64/006; H04W 24/08; H04W 64/00; G01S 5/0009; G01S 5/02
See application file for complete search history.

(56) References Cited

U.S. PATENT DOCUMENTS

2012/0082051 A1* 4/2012 Kim ..................... H04W 24/10
                                                              370/252
2012/0320845 A1   12/2012 Choi et al.
(Continued)

FOREIGN PATENT DOCUMENTS

KR      2011-0088382 A    8/2011
KR    10-2012-0005193 A   1/2012
(Continued)

*Primary Examiner* — Mehmood B Khan
(74) *Attorney, Agent, or Firm* — Birch, Stewart, Kolasch & Birch, LLP

(57) ABSTRACT

Provided is a method for evaluating correlation validity between an estimation result and location information performed by a network object in a wireless communication system. The method comprises: obtaining from user equipment the estimation result from a first point in time; obtaining from the user equipment location information from a second point in time; obtaining correlation validity information for determining correlation and evaluating the correlation validity; and performing the correlation validity evaluation on the basis of the correlation for determining whether the location information is highly correlated to the estimation result. When the location information is determined to have a high correlation to the estimation result through the correlation validity evaluation, the location information is used for optimizing network performance. When the location information is determine to have a low correlation to the estimation result through the correlation validity evaluation, the estimation result is used for optimizing network performance.

13 Claims, 18 Drawing Sheets

(56) References Cited

U.S. PATENT DOCUMENTS

| | | | | |
|---|---|---|---|---|
| 2013/0148534 A1* | 6/2013 | Jung | .................... | H04W 24/02 370/252 |
| 2013/0155896 A1 | 6/2013 | Lim et al. | | |
| 2013/0170484 A1 | 7/2013 | Kang et al. | | |
| 2013/0183908 A1 | 7/2013 | Jung et al. | | |
| 2013/0235749 A1 | 9/2013 | Cho et al. | | |
| 2013/0329593 A1* | 12/2013 | Kim | .................... | H04W 24/10 370/252 |
| 2013/0337789 A1* | 12/2013 | Johnson | ................ | H04W 4/02 455/414.1 |
| 2014/0078973 A1* | 3/2014 | Kazmi | .................... | H04W 8/22 370/329 |
| 2014/0233457 A1* | 8/2014 | Koutsimanis | .......... | H04J 11/005 370/328 |
| 2015/0094102 A1* | 4/2015 | Jung | .................... | H04W 24/02 455/456.6 |

FOREIGN PATENT DOCUMENTS

| | | | | |
|---|---|---|---|---|
| KR | 10-2012-0041972 A | 5/2012 | | |
| KR | WO 2012111950 A2 * | 8/2012 | ............ | H04W 24/10 |
| WO | WO 2012/023683 A1 | 2/2012 | | |
| WO | WO 2012/044047 A2 | 5/2012 | | |

* cited by examiner

METHOD FOR EVALUATING CORRELATION VALIDITY BETWEEN ESTIMATION RESULT AND LOCATION INFORMATION IN WIRELESS COMMUNICATION SYSTEM, AND APPARATUS SUPPORTING SAME

CROSS REFERENCE TO RELATED APPLICATIONS

This application is the National Phase of PCT/KR2013/004098 filed on May 9, 2013, which claims priority under 35 U.S.C. 119(e) to U.S. Provisional Application No. 61/645,023 filed on May 9, 2012, all of which are hereby expressly incorporated by reference into the present application.

BACKGROUND OF THE INVENTION

1. Field of the Invention

The present invention relates to wireless communication and, more particularly, to a method for evaluating the validity of a correlation between location information and a measurement result and an apparatus for supporting the same.

2. Related Art $3^{rd}$ generation partnership project (3GPP) Long Term Evolution (LTE) is an improved version of a Universal Mobile Telecommunication System (UMTS) and is introduced as the 3GPP release 8. The 3GPP LTE uses Orthogonal Frequency Division Multiple Access (OFDMA) in a downlink, and uses Single Carrier-Frequency Division Multiple Access (SC-FDMA) in an uplink. The 3GPP LTE employs Multiple Input Multiple Output (MIMO) having up to four antennas. In recent years, there is an ongoing discussion on 3GPP LTE-Advanced (LTE-A), that is, an evolution of the 3GPP LTE.

In order to optimize network performance, a network obtains a measurement result from UE. In this case, the network may also obtain location information related to the measurement result from the UE and more efficiently optimize network performance. For the optimization of networks, service providers may obtain a measurement result and location information using pieces of UE. This is called a Minimization of Driving Test (MDT).

UE performs positioning while obtaining a measurement result in order to obtain location information related to the measurement result. When the location information and the measurement result are simultaneously obtained, the location information may be indicative of the measurement location of the UE that perform measurements relatively precisely. In contrast, if a point of time at which the location information was obtained is different from a point of time at which the measurement result was obtained, there may be a problem in that the measurement location of the UE is not precisely indicated by the location information because a correlation between the location information and the measurement result is low. Assuming that an object of providing the location information of UE to be measured is to optimize network performance, to provide the location information having a low correlation with a measurement result may hinder the original object.

SUMMARY OF THE INVENTION

An object of the present invention is to provide a method for evaluating the validity of a correlation between location information and a measurement result in a wireless communication system and an apparatus for supporting the same.

In an aspect, there is provided a method for evaluating the validity of a correlation between a measurement result and location information, which is performed by a network entity in a wireless communication system. The method includes obtaining a measured result from user equipment at a first point of time, obtaining location information from the user equipment at a second point of time, obtaining correlation validity information for determining a correlation and evaluating correlation validity, determining the correlation between the location information and the measured result, and performing the correlation validity evaluation for determining whether the location information has a high correlation with the measured result based on the correlation. If the location information is determined to have a high correlation with the measured result based on the correlation validity evaluation, the measured result and the location information are used for network performance optimization, and if the location information is determined to have a low correlation with the measured result based on the correlation validity evaluation, the measured result is used for the network performance optimization.

The correlation validity information may include time information at the first point of time and time information at the second point of time. Determining the correlation may include calculating a time interval between the first point of time and the second point of time as the correlation.

Evaluating the correlation validity may include comparing the time interval with a specific time reference value and determining the location information to have a high correlation with the measured result if the time interval is smaller than the specific time reference value.

The correlation validity information may include time information at the first point of time, information about a speed of the user equipment at the first point of time, time information at the second point of time, and information about a speed of the user equipment at the second point of time.

Determining the correlation may include calculating a distance interval between the location of the user equipment at the first point of time and the location of the user equipment at the second point of time as the correlation. The distance interval may be calculated as in an equation below. $D_{mp}=|T_m-T_p|\times v_p$ wherein $D_{mp}$ is the distance interval, $T_m$ is the first point of time, $T_p$ is the second point of time, and $v_p$ is the speed of the user equipment.

Evaluating the correlation validity may include comparing the distance interval with a specific distance reference value and determining the location information to have a high correlation with the measured result if the distance interval is smaller than the distance reference value.

The speed may be a speed of the user equipment measured at the first point of time.

The speed may be a speed of the user equipment measured at the second point of time.

The speed may be an average value of a speed of the user equipment measured at the first point of time and a speed of the user equipment measured at the second point of time.

The speed may be set as a specific speed value corresponding to an estimated mobility state of the user equipment.

The correlation validity information may be obtained when the correlation validity information is transmitted to the network entity in response to the instruction of the network entity that instructs the correlation validity information to be reported.

The method may further include forwarding the measured result and the location information having a high correlation with the measured result to a collection network entity which collects the measured result and the location information having a high correlation with the measured result.

In another aspect, there is provided a wireless apparatus operating in a wireless communication system. The wireless apparatus includes a Radio Frequency (RF) unit sending and receiving radio signals and a processor operating in conjunction with the RF unit functionally. The processor is configured to obtain a measured result from user equipment at a first point of time, obtain location information from the user equipment at a second point of time, obtain correlation validity information for determining a correlation and evaluating correlation validity, determine the correlation between the location information and the measured result, and perform the correlation validity evaluation for determining whether the location information has a high correlation with the measured result based on the correlation. If the location information is determined to have a high correlation with the measured result based on the correlation validity evaluation, the measured result and the location information are used for network performance optimization. If the location information is determined to have a low correlation with the measured result based on the correlation validity evaluation, the measured result is used for the network performance optimization.

In accordance with an embodiment of the present invention, a network can determine whether obtained location information has a high correlation with a measurement result. A network can optionally obtain location information that may be properly used for network performance optimization, and network performance optimization can be more efficiently performed because location information having a low correlation is excluded.

DESCRIPTION OF EXEMPLARY EMBODIMENTS

Figure 1:
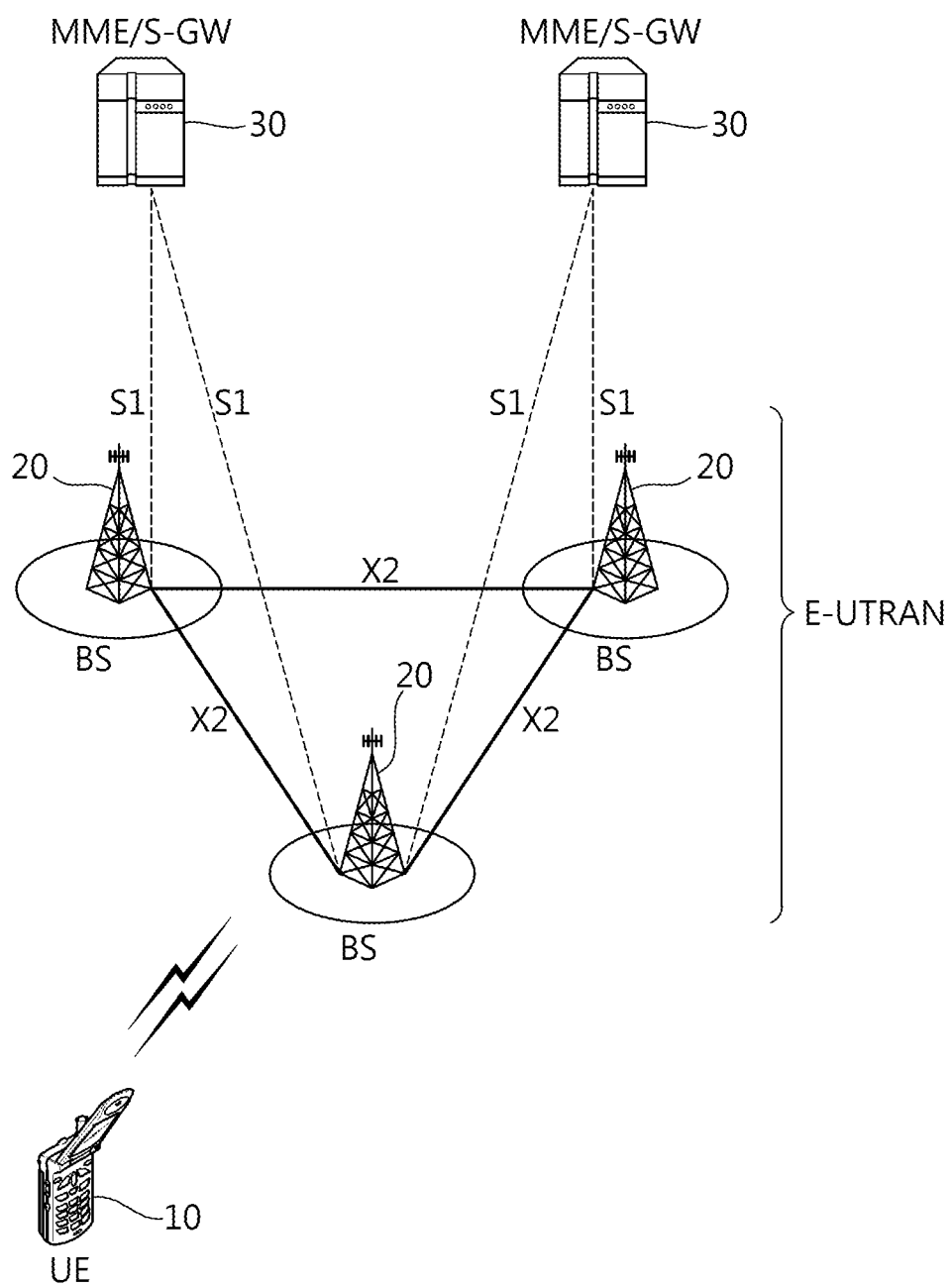
FIG. 1 illustrates a wireless communication system to which the present invention is applied.

FIG. 1 illustrates a wireless communication system to which the present invention is applied. The wireless communication system may also be referred to as an Evolved-UMTS Terrestrial Radio Access Network (E-UTRAN) or a Long Term Evolution (LTE)/LTE-A system.

The E-UTRAN includes at least one Base Station (BS) 20 which provides a control plane and a user plane to User Equipment (UE) 10. The UE 10 may be fixed or mobile, and may be referred to as another terminology, such as a Mobile Station (MS), a User Terminal (UT), a Subscriber Station (SS), a Mobile Terminal (MT), or a wireless device. The BS 20 is generally a fixed station that communicates with the UE 10 and may be referred to as another terminology, such as an evolved Node-B (eNB), a Base Transceiver System (BTS), or an access point.

The BSs 20 are interconnected through an X2 interface. The BSs 20 are also connected to an Evolved Packet core (EPC) 30 through an S1 interface, more specifically, to a Mobility Management Entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

The Layers of a radio interface protocol between the UE and the network may be classified into a first layer (L1), a second layer (L2), and a third layer (L3) based on the lower three layers of the Open System Interconnection (OSI) model that is well-known in communication systems. From the lower three layers, a physical (PHY) layer belonging to the first layer provides an information transfer service using physical channels, and a Radio Resource Control (RRC) layer belonging to the third layer serves to control radio resources between the UE and the network. To this end, the RRC layer exchanges RRC messages between the UE and the BS.

Figure 2:
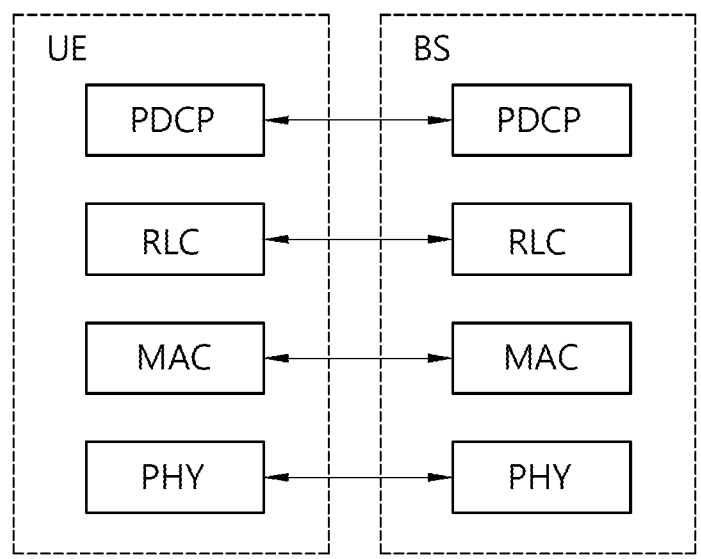
FIG. 2 is a block diagram illustrating the wireless protocol architecture of a user plane.
Figure 3:
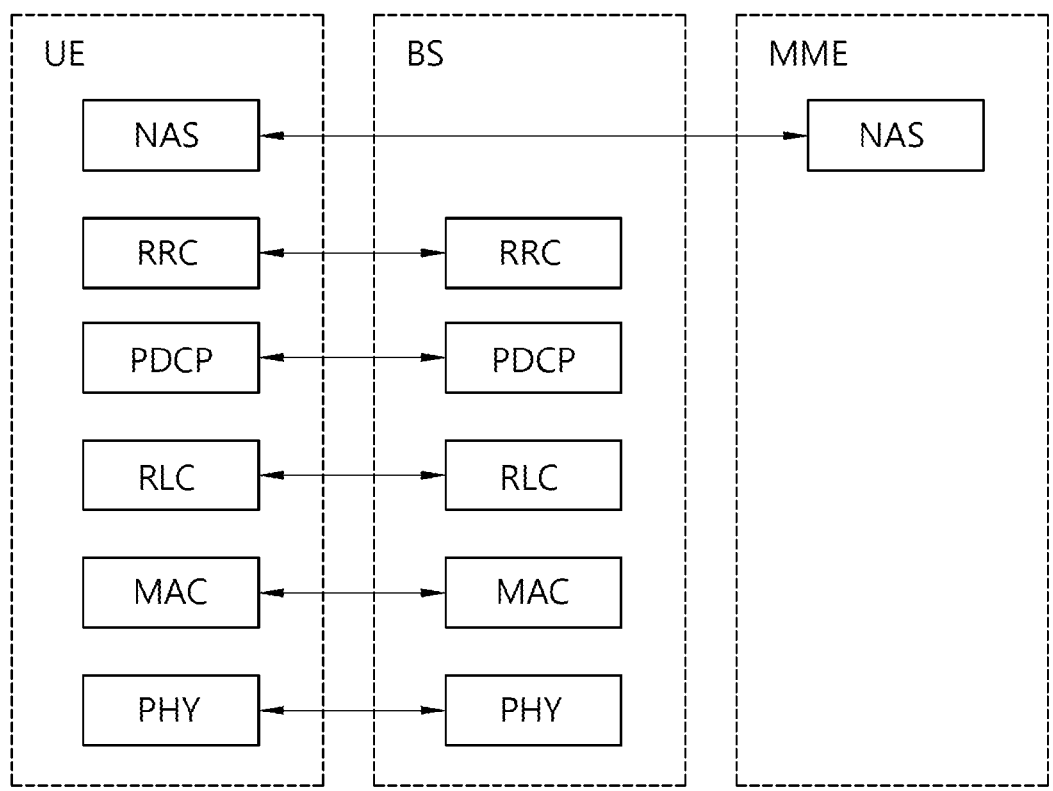
FIG. 3 is a block diagram illustrating the wireless protocol architecture of a control plane.

FIG. 2 is a block diagram illustrating the wireless protocol architecture of a user plane. FIG. 3 is a block diagram illustrating the wireless protocol architecture of a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a Medium Access Control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, between the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The Radio Resource Control (RRC) layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (the MAC layer, the RLC layer, and the PDCP layer) in order to transfer data between UE and a network.

The function of a Packet Data Convergence Protocol (PDCP) layer on the user plane includes the transfer, header compression, and ciphering of user data. The function of the PDCP layer on the control plane includes the transfer and encryption/integrity protection of control plane data.

What an RB is configured means a process of defining the characteristics of a wireless protocol layer and channels in order to provide a specific service and of configuring each detailed parameter and operating method. An RB may be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in an RRC idle state.

A downlink transport channel through which data is transmitted from a network to UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state and an RRC connection method of UE are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as the RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
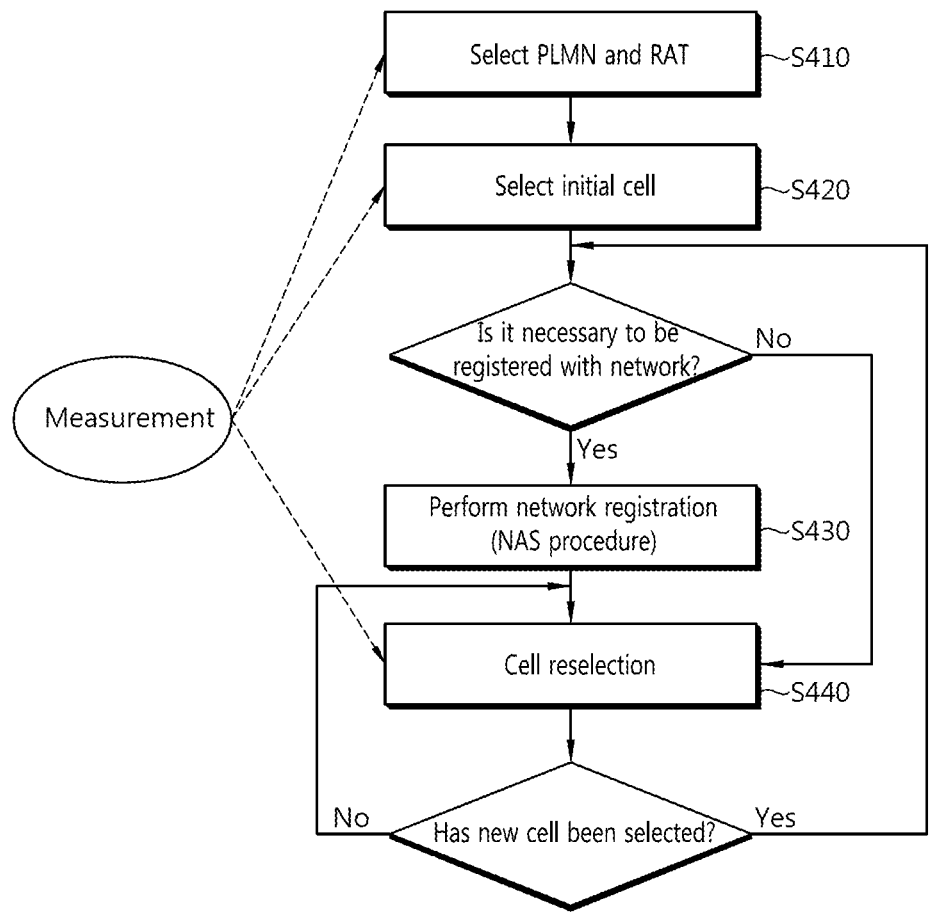
FIG. 4 is a flowchart illustrating the operation of UE in an RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
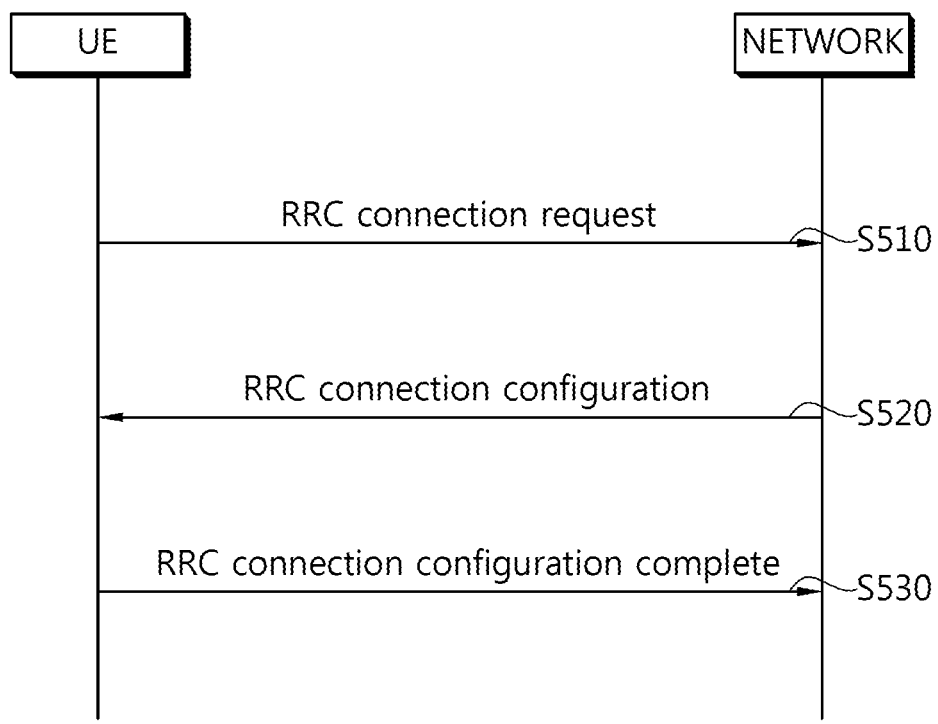
FIG. 5 is a flowchart illustrating a process of establishing RRC connection.

FIG. 5 is a flowchart illustrating a process of establishing RRC connection.

UE sends an RRC connection request message that requests RRC connection to a network (S510). In response to the RRC connection request, the network sends an RRC connection establishment message (S520). After receiving the RRC connection establishment message, the UE enters RRC connected mode.

The UE sends an RRC connection establishment complete message used to check the successful completion of the RRC connection to the network (S530).

Figure 6:
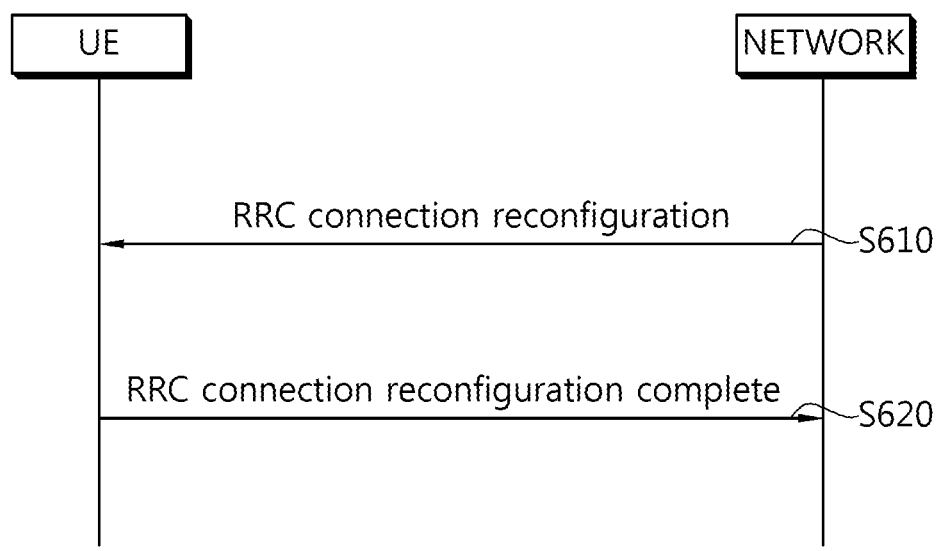
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). In response to the RRC connection reconfiguration message, the UE sends an RRC connection reconfiguration complete message used to check the successful completion of the RRC connection reconfiguration to the network (S620).

A Public Land Mobile Network (PLMN) is described below.

The PLMN is a network deployed and operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted.

In the selection of a PLMN, cell selection, and cell reselection, UE may take a variety of types of PLMNs into consideration.

A Home PLMN (HPLMN): a PLMN having MCC and MNC matched with the MCC and MNC of an UE IMSI.

An Equivalent HPLMN (EHPLMN): a PLMN treated equally with an HPLMN.

A Registered PLMN (RPLMN): a PLMN whose location registration has been successfully completed.

An Equivalent PLMN (EPLMN): a PLMN treated equally with an RPLMN.

Each mobile service consumer joins an HPLMN. When an HPLMN or EHPLMN provides UE with common services, the UE is not in a roaming state. In contrast, when a PLMN other than an HPLMN/EHPLMN provides service to UE, the UE is in a roaming state, and the PLMN is also called a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identity of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A procedure of selecting, by UE, a cell is described in detail.

When UE is powered on or camps on in a cell, the UE selects/reselects a cell having proper quality and performs procedures for being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the UE.

A method and procedure in which UE selects a cell in 3GPP LTE is described in detail with reference to 3GPP TS 36.304 V8.5.0 (2009-03) "User Equipment (UE) procedures in idle mode (Release 8)."

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighboring cells for cell reselection.

Second, cell reselection is performed based on a cell reselection criterion. The cell reselection criterion has the following characteristics in relation to the measurements of a serving cell and neighboring cells.

Intra-frequency cell reselection is basically based on ranking. Ranking is a task for defining a reference value for evaluating cell reselection and numbering cells using reference values according to the size of the reference values. A cell having the best criterion is commonly called the best-ranked cell. The cell reference value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. Cell reselection priority provided through broadcast signaling may be called common priority, and cell reselection priority set by a network for each piece of UE may be called dedicated priority. When receiving dedicated priority, UE may also receive a validity time related to the dedicated priority. When receiving the dedicated priority, the UE initiates a validity timer set to the validity time received along with the dedicated priority. While the validity timer operates, the UE applies the dedicated priority in RRC idle mode. When the validity timer expires, the UE discards the dedicated priority and applies common priority again.

For inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}  R_n = Q_{meas,n} - Q_{offset}$$

In this case, $R_s$ is the ranking criterion of a serving cell, $R_n$ is the ranking criterion of a neighboring cell, $Q_{meas,s}$ is the quality value of the serving cell measured by UE, $Q_{meas,n}$ is the quality value of the neighboring cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighboring cell, $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighboring cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighboring cell according to the above equation, considers a cell having the greatest ranking reference value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values $Q_{out}$ and $Q_{in}$. The threshold value $Q_{out}$ is defined as a level at which a downlink radio link is unable to be stably received, which corresponds to a block error rate of 10% of hypothetical PDCCH transmission by taking into consideration a PDFICH error. The threshold value $Q_{in}$ is defined as a downlink radio link quality level at which a downlink radio link is able to be more stably received than compared to the level of $Q_{out}$, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured result of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
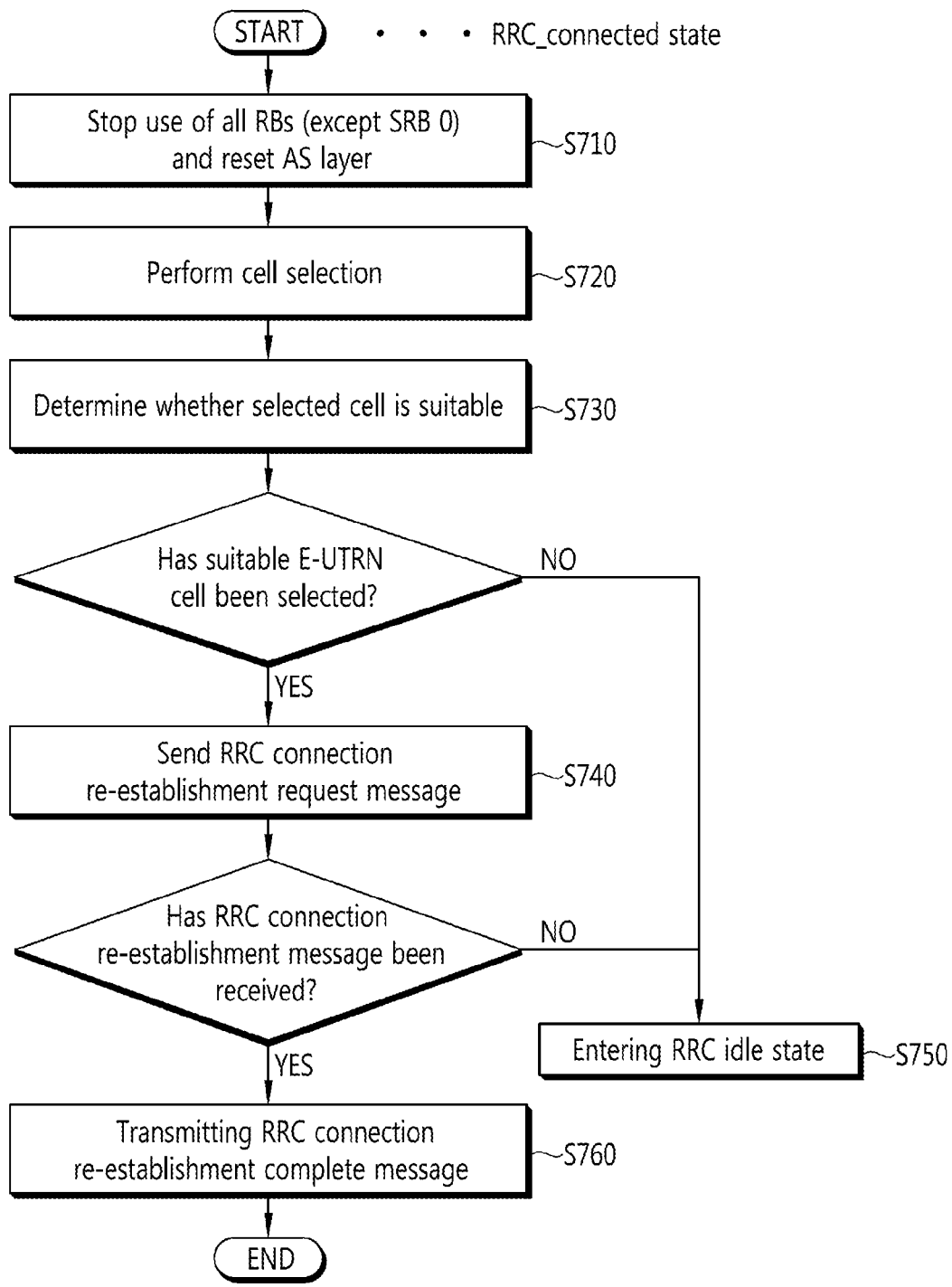
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A Tacking Collection Entity (TCE) is described below.

A subscriber and an equipment trace provide very detailed information about one or more specific mobiles in a call level. The data may be an additional source for information for performance measurements. Furthermore, the data enables a further deep monitoring and optimization operation to be performed. Unlike in a performance measurement that is always the source of information, the trace may be activated in response to user needs/requirements during a limited time interval for a specific analysis purpose. The trace plays a very important role in operations, such as determining a fundamental cause of a malfunctioning mobile, an improved troubleshoot, the optimization the use of resource and quality, control of Radio Frequency (RF) coverage, capacity improvements, an analysis of a break-up phenomenon during a call, and the check of an UMTS procedure between the ends of a core network and an UTRAN.

For service initiated by a specific user (e.g., an International Mobile Subscriber Identity (IMSI)), a mobile type (e.g., an International Mobile Equipment Identity (IMEI) Software Version (IMEISV)), or a user, a function for logging data on an interface in a call level enables information that may not be inferred from performance measurements, such the recognition of the final user QoS during a call (e.g., requested QoS versus provided QoS), a correlation between protocol messages and RF measurements, or mutual information processing operation with specific mobile vendors, to be obtained. Trace data is collected by the TCE.

A Minimization of Driving Tests (MDT) is described below.

An MDT enables UE to perform measurement and to report a result of the measurement instead of a drive test in which conventional operators measure the quality of cells using vehicles for the coverage optimization of the cells. Coverage varies depending on the location of a BS, the deployment of surrounding buildings, and an environment used by a user. Accordingly, an operator needs to periodically perform a drive test, which requires great expense and lots of resources. In order to overcome such a disadvantage, there is proposed an MDT in which an operator measures coverage using UE.

An operator may synthesize MDT measurement values received from multiple UEs, may write a coverage map indicative whether service is available in an overall area in which an operator provides the service and a distribution of qualities of service, and may use the coverage map in network operations and optimization. For example, when a coverage problem in a specific area is reported by UE, an operator may extend the coverage of a cell in the corresponding area by increasing the transmission power of a BS that provides service in the corresponding area. The time and expense for network optimization can be minimized through such as method.

The MDT has been made based on the framework of a trace function, that is, one of the tools of an operator for Operation, Administration, and Maintenance (OAM). The trace function provides an operator with the ability to perform trace and log the behaviors of UE, and thus it may enable a main cause of a defective function on the UE side to be determined. Traced data is collected over a network, and is called a Trace Collection Entity (TCE). An operator uses data collected by a TCE for analysis and evaluation purposes. A trace function used for an MDT includes signaling based on the trace function and management based on trace functions. Signaling based on a trace function is used to activate an MDT task toward specific UE, whereas management based on trace functions is used to activate an MDT task without being limited to specific UE.

An MDT may be divided into two types: a logged MDT and an immediate MDT depending on whether UE reports measured and stored log data in a real-time manner or in real time. The logged MDT is a method by which UE performs MDT measurements, logs measurement data, and subsequently sends the logged data to a network. In contrast, the immediate MDT is a method by which UE performs MDT measurements and immediately sends measurement data to a network. In accordance with the logged MDT, UE may perform MDT measurements in the RRC idle state. In accordance with the immediate MDT, UE performs MDT measurements in the RRC connection state.

Figure 8:
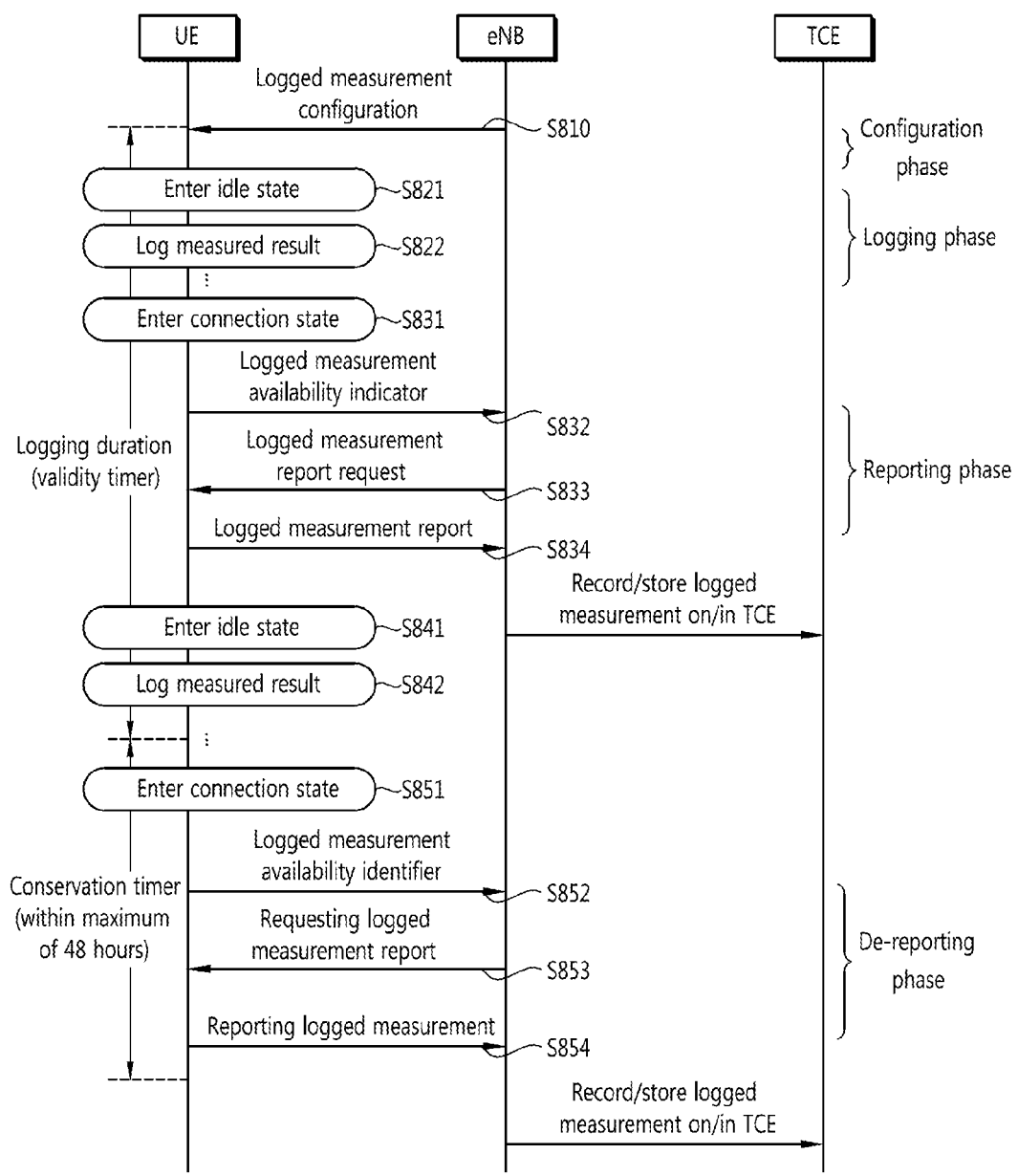
FIG. 8 is a flowchart illustrating a method of performing a logged MDT.

FIG. 8 is a flowchart illustrating a method of performing a logged MDT.

Referring to FIG. 8, UE receives a logged measurement configuration (S810). The logged measurement configuration may be included in an RRC message, and may be transmitted through a downlink control channel. The logged measurement configuration may include at least one of the ID of a TCE, information about the time that is a reference on which logging is performed (i.e., a reference time), logging duration, a logging interval, and information about an area configuration. The logging interval is indicative of an interval in which a measured result is stored. The logging duration is indicative of duration for which UE performs a logged MDT. The reference time is indicative of the time that is the reference of duration for which a logged MDT is performed. The area configuration is indicative of an area on which the execution of logging has been requested by UE.

Meanwhile, the UE starts a validity timer when receiving the logged measurement configuration. The validity timer is indicative of the lifespan of the logged measurement configuration, and may be specified based on information about logging duration. The duration of the validity timer may be indicative of the validity of a measured result owned by the UE in addition to the valid lifespan of the logged measurement configuration.

As described above, a procedure in which the UE performs the logged measurement configuration and a corresponding overall procedure is performed is called a configuration phase.

When the UE enters the RRC idle state (S821), the UE logs a measured result while the validity timer operates (S822). The value of the measured result may be RSRP, RSRQ, Received Signal Code Power (RSCP), or Ec/No. Information on which the measured result has been logged is hereinafter called logged measurement and/or a measured result log. A temporal section in which UE logs a measured result at least once is called a logging phase.

To perform, by the UE, the logged MDT based on the logged measurement configuration may vary depending on the location where the UE is present.

Figure 9:
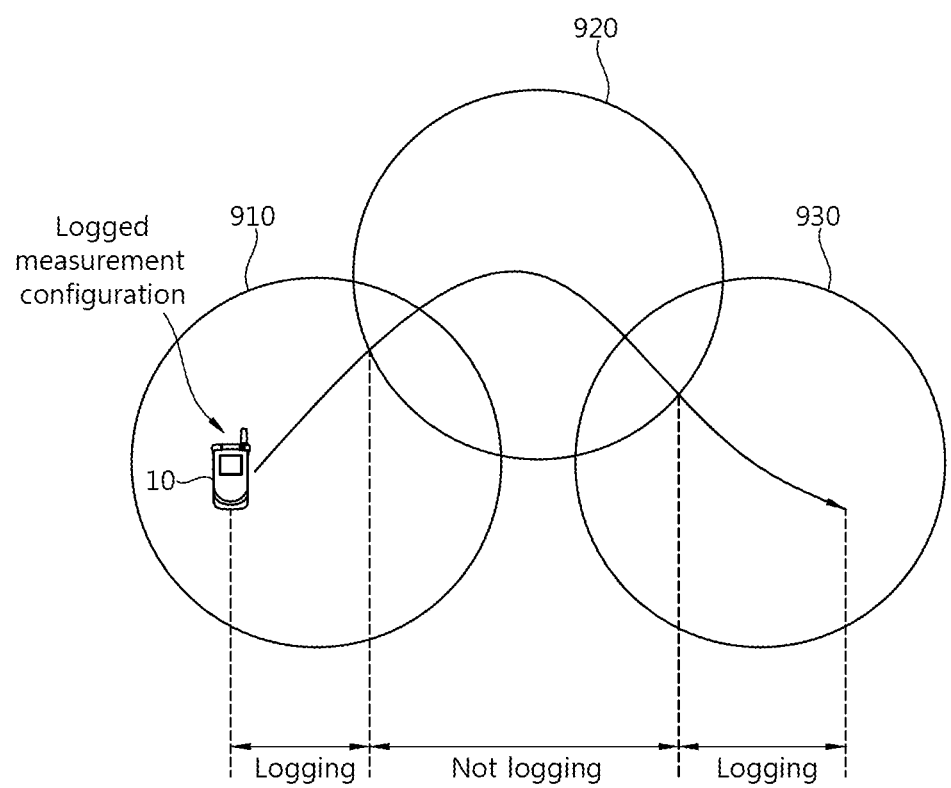
FIG. 9 is a diagram illustrating an example of logged MDTs according to logged areas.

FIG. 9 is a diagram illustrating an example of logged MDTs according to logged areas.

A network may configure a logging area, that is, an area on which UE has to log. The logging area may be expressed as a cell list, or may be expressed as a tracking area/location area list. If a logging area is configured for UE, the UE stops logging if it deviates from the logging area.

Referring to FIG. 9, a first area 910 and a third area 930 are areas configured as logging areas, and a second area 920 is an area in which logging is not permitted. UE performs logging in the first area 910, but does not perform logging in the second area 920. The UE perform logging again when it moves from the second area 920 to the third area 930.

Figure 10:
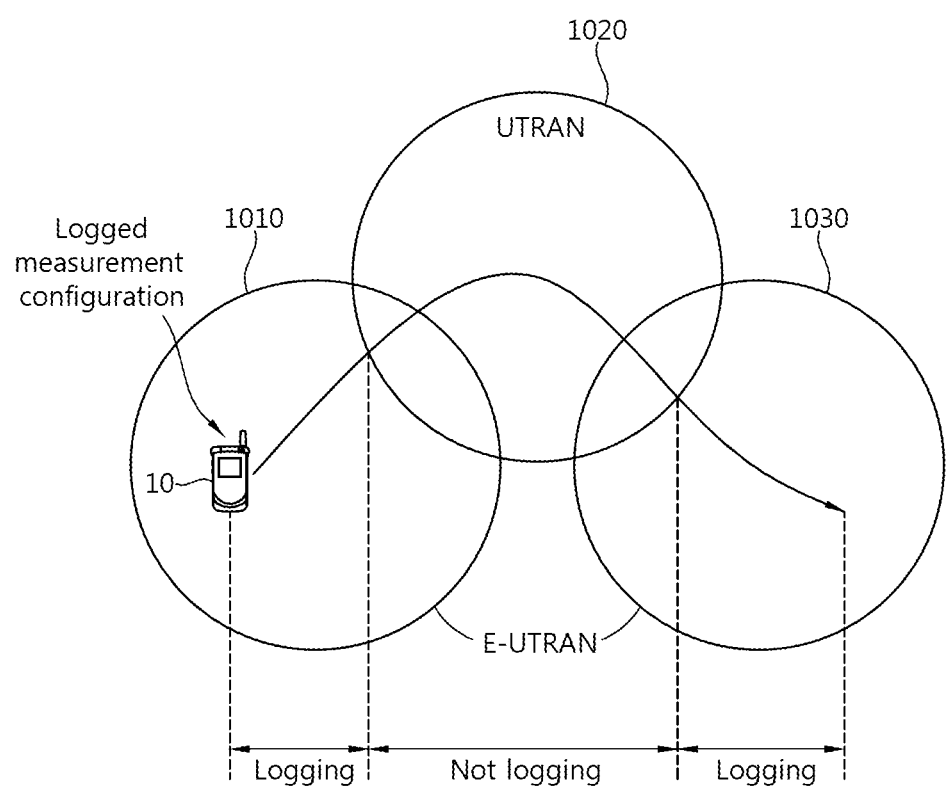
FIG. 10 is a diagram illustrating an example of a logged MDT according to a change of an RAT.

FIG. 10 is a diagram illustrating an example of a logged MDT according to a change of an RAT.

UE performs logging only when it camps on an RAT from which a logged measurement configuration has been received, but stops logging in other RATs. In this case, the UE may log cell information for other RATs in addition to the RAT on which the UE camps.

A first area 1010 and a third area 1030 are E-UTRAN areas, and a second area 1020 is an UTRAN area. A logged measurement configuration is received from the E-UTRAN. UE does not perform MDT measurement when it enters the second area 1020.

Referring back to FIG. 8, the UE enters the RRC connection state (S831). If logged measurement to be reported is present, the UE informs an eNB that the logged measurement to be reported is present (S832). The UE may inform the eNB that the logged measurement to be reported is present when RRC connection is established, RRC connection is re-established, or RRC connection is reconfigured. Furthermore, if the UE performs handover, the UE may inform the eNB that logged measurement for a handover target cell is present. To inform, by the UE, the eNB that the logged measurement is present may include including a logged measurement-available indicator, that is, indication information that provides notification of the presence of the logged measurement, in an RRC message transmitted from the UE to the eNB, and sending the RRC message including the logged measurement-available indicator. The RRC message may be an RRC connection establishment complete message, an RRC connection re-establishment complete message, an RRC reconfiguration complete message, or a handover complete message.

When a signal that provides notification of the presence of the logged measurement is received from the UE, the eNB requests the UE to report the logged measurement (S833). To request the logged measurement to be reported may include including a logged measurement report request parameter regarding information indicative of the request in an RRC message, and sending the RRC message including the logged measurement report request parameter. The RRC message may be a UE information request message.

When the UE receives the request to report the logged measurement from the eNB, the UE reports the logged measurement to the eNB (S834). To report the logged measurement to the eNB may include including a logged measurement report, including the logged measurement, in an RRC message, and sending the RRC message to the eNB. The RRC message may be a UE information report message. In reporting the logged measurement, the UE may report all the logged measurements of the UE at a report time point to the eNB, or may report some of all the logged measurements to the eNB. If some of the logged measurements are reported, the reported some measurements may be discarded.

A phase in which a process of informing, by the UE, the eNB that the logged measurement is present, receiving the request to report the logged measurement from the eNB, and reporting the logged measurement in response to the request is performed as described above is called a reporting phase.

While the logged MDT is performed, the UE chiefly measures a wireless environment. The MDT measurement may include the identity of a cell and the signal quality and/or signal intensity of the cell. The MDT measurement may include a measurement time and a measurement place. The following table illustrates contents logged by UE.

TABLE 2

| PARAMETER (SET) | DESCRIPTION |
| --- | --- |
| Serving cell identity | Global cell identity of serving cell |
| Measured results of serving cell | Measured RSRP of serving cell<br>Measured RSRQ of serving cell |
| Measured results of neighbor cell | Cell identities of measured E-UTRA cells, measured results of E-UTRA cells<br>Cell identities of measured UTRA cells, measured results of UTRA cells<br>Cell identities of measured GERAN cells, measured results of GERAN cells<br>Cell identities of measured CDMA 2000 cells, measured results of CDMA 2000 cells |
| Time stamp | The moment of logging measured results, calculated (as current time minus absoluteTimeStamp in seconds) |
| Location information | Detailed location information at the moment of logging |

Pieces of information logged at different logging points of time may be stored as follows so that they are classified into different log entries.

Figure 11:
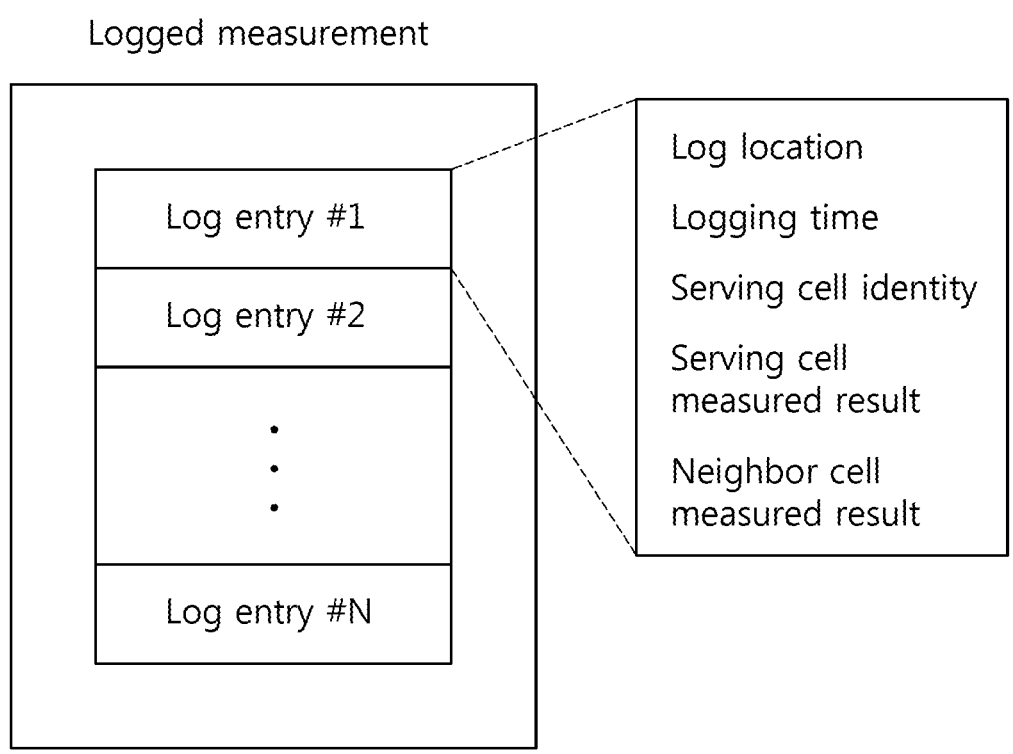
FIG. 11 is a diagram illustrating an example of logged measurements.

FIG. 11s a diagram illustrating an example of logged measurements.

Logged measurement includes one or more log entries.

The log entry includes a logging location, a logging time, a serving cell identity, a measured result of a serving cell, and a measured result of a neighboring cell.

The logging location is indicative of the location where UE was measured. The logging time is indicative of the time when UE was measured. Pieces of information logged at different logging times are stored in different log entries.

The serving cell identity may include a cell identity in Layer 3, which is called a Global Cell Identity (GCI). The GCI is a set of a Physical Cell Identity (PCI) and a PLMN identity.

Meanwhile, UE may analyze indices related to the performance of the UE in addition to a wireless environment, and log the analyzed indices. For example, the indices may include throughput, an erroneous transmission/reception rate, etc.

Referring back to FIG. 8, the logging phase and the reporting phase may be present in logging duration plural times (S841, S842).

When logged measurement is reported, the eNB may record/store the logged measurement in the TCE.

After the validity timer expires, that is, after the logging duration elapses, if the UE has logged measurement that has not yet been reported, the UE performs a procedure for reporting the logged measurement to the eNB. A phase in which an overall procedure for reporting the logged measurement is called a post-reporting phase.

After the logging duration is terminated, the UE discards the logged measurement configuration and starts a conservation timer. After the logging duration is terminated, the UE stops MDT measurement. However, already logged measurement remains without being discarded. The conservation timer is indicative of the lifespan of the remaining logged measurement.

When the UE enters the RRC connection state before the conservation timer expires (S851), the UE may report not-reported logged measurement to the eNB. In such a case, the aforementioned procedure for a logged measurement report may be performed (S852, S853, and S854). If the conservation timer expires, the remaining logged measurement may be discarded. When logged measurement is reported, the eNB may record/store the logged measurement in the TCE.

The conservation timer may be fixed to a value predetermined in the UE, and may be previously set in the UE. For example, the value of the conservation timer may be 48 hours. Alternatively, the value of the conservation timer may be included in a logged measurement configuration and transferred to the UE, or may be included in another RRC message and transferred to the UE.

Meanwhile, when a new logged measurement configuration is transferred to the UE, the UE may update an existing logged measurement configuration with a newly obtained logged measurement configuration. In such a case, the validity timer may be started again from a time point at which a logged measurement configuration is newly received. Furthermore, logged measurement based on a previous logged measurement configuration may be discarded.

Figure 12:
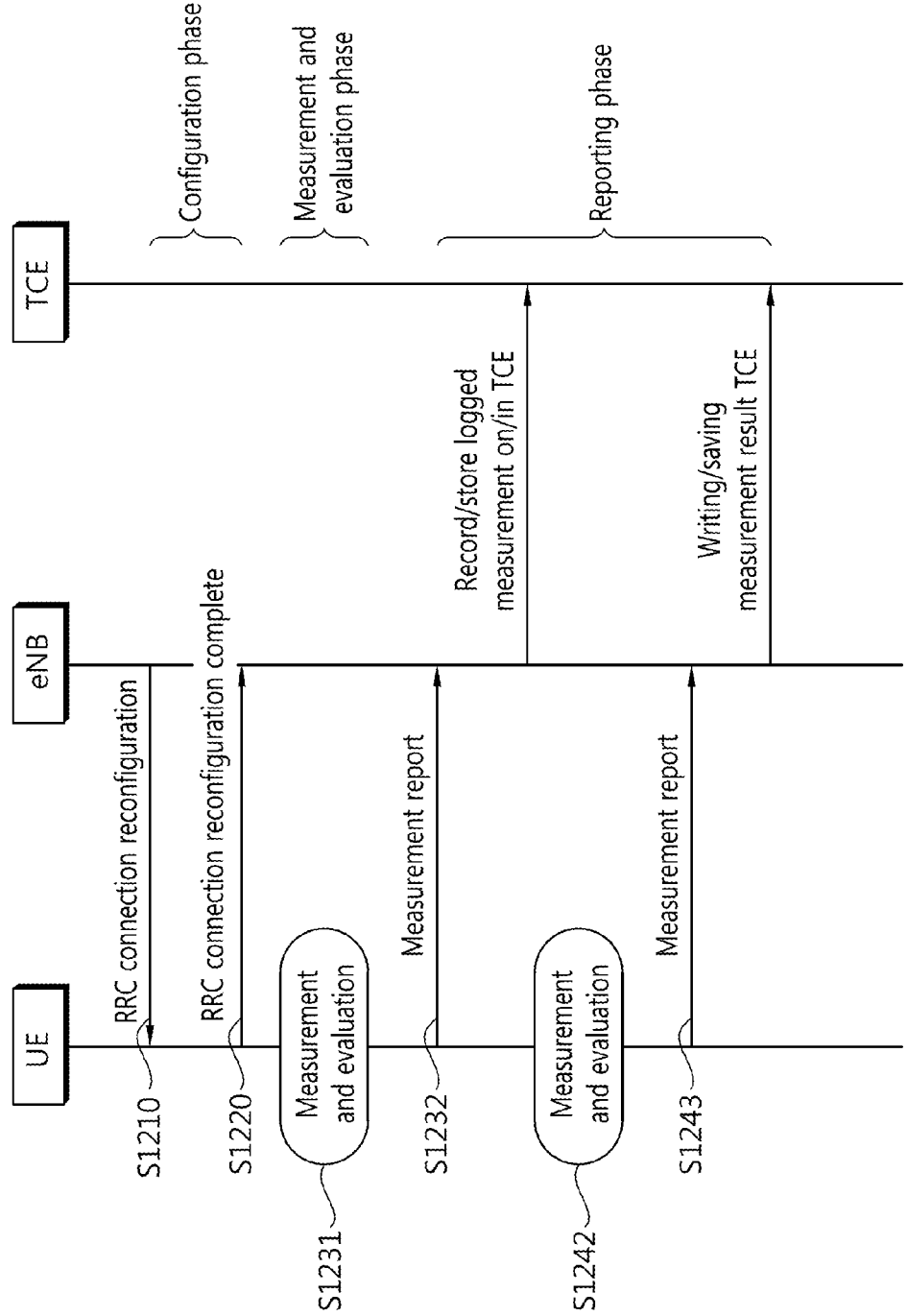
FIG. 12 is a diagram illustrating an example of an immediate MDT.

FIG. 12 is a diagram illustrating an example of an immediate MDT. The immediate MDT is based on a Radio Resource Management (RRM) measurement and report mechanism. When a measurement report is made, information related to the location is additionally added to the immediate MDT and reported to an eNB.

Referring to FIG. 12, UE receives an RRC connection reconfiguration message (S1210), and sends an RRC connection reconfiguration complete message (S1220). Accordingly, the UE enters the RRC connection state. The UE may receive a measurement configuration by receiving the RRC connection reconfiguration message. In the example of FIG. 12, the measurement configuration is received through the RRC connection reconfiguration message, but may be included in another RRC message and transmitted.

The UE performs measurement and evaluation in the RRC connection state (S1231), and reports a measured result to an eNB (S1232). In the immediate MDT, the measured result may provide precise location information as in the example of Global Navigation Satellite System (GNSS) location information if possible. For location measurement, such as fingerprint, the measured result may provide neighbor cell measurement information that may be used to determine the location of the UE.

From FIG. 12, it may be seen that even after the measurement and evaluation (S1231) and report (S1232) first performed, the UE reports the measured result to the eNB (S1243) right after performing measurement and evaluation (S1242). This is the greatest difference between the logged MDT and the immediate MDT.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurement.

A failure location.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure. The RLF report may be taken into consideration as part of an MDT.

Accessibility measurement is described below.

To handle the non-availability measurement of connection for UE includes many aspects. In this case, both common channels and connection procedures are handled. In order to notify a network of the non-availability of connection and thus to help parameter optimization for increasing the validity of connection, UE performs accessibility measurement when a connection establishment failure occurs. For the accessibility measurement, the UE performs the following logging.

A time stamp induced using a relative timer that counts time between a failure and a report is included. A storage time for accessibility measurement is 48 hours.

To report the number of transmitted random access preambles is supported.

To indicate whether a maximum power level has been reached is included.

To indicate whether a contention has been detected during a random access procedure for connection establishment is included.

Accessibility measurement may be taken into consideration as part of an MDT.

The mobility states of UE are described below. If UE passes through cells at high speed, the UE may be subject to an unavailable service state because mobility to neighboring cells is not properly performed. Accordingly, if the values of parameters related to mobility are optimized for the speed of UE depending on the speed of the UE, the movement of the UE can be well performed and mobility performance can be improved. If UE determines a mobility state through Mobility State Estimation (MSE) and scales parameters (e.g., Treselection, TimeTotrigger) related to a movement based on the determined mobility state of the UE as described above, the UE may more efficiently perform movements, such as cell selection/reselection/handover.

The mobility states of UE may be classified into a high mobility state, a medium mobility state, and a normal mobility state. Each of the mobility states may be determined based on the number of times that UE has performed handover and/or the number of times that UE has performed cell reselection.

UE in the RRC_IDLE state performs cell reselection if a cell reselection condition is satisfied. If the number of times that the UE has performed cell reselection during a specific time interval $T_{CRmax}$ exceeds a first threshold $N_{CR\_H}$, the mobility state of the UE satisfies the condition of the high mobility state. Meanwhile, if the number of times that the UE has performed cell reselection during the specific time interval $T_{CRmax}$ exceeds a second threshold $N_{CR\_M}$ and does not exceed the first threshold $N_{CR\_H}$, the mobility state of the UE satisfies the condition of the medium mobility state. If the number of times that the UE has performed cell reselection during the specific time interval $T_{CRmax}$ does not exceed the second threshold $N_{CR\_M}$, the mobility state of the UE satisfies the condition of the normal mobility state. In this case, if the UE has consecutively performed cell reselection between two identical cells, the number of times that the UE has consecutively performed such cell reselection may not be counted as the number of times that the UE has performed cell reselection.

UE in the RRC_CONNECTED state reports a result of measurement and performs handover, if a specific condition is satisfied when performing the measurement on a neighboring cell. If the number of times that the UE has performed handover during a specific time interval exceeds a first threshold, the mobility state of the UE satisfies the condition of the high mobility state. Meanwhile, if the number of times that the UE has performed handover during the specific time interval exceeds a second threshold and does not exceed the first threshold, the mobility state of the UE satisfies the condition of the medium mobility state. If the number of times that the UE has performed handover during the specific time interval does not exceed the second threshold, the mobility state of the UE satisfies the condition of the normal mobility state.

UE in the RRC_IDLE state or the RRC_CONNECTED state may enter a corresponding mobility state if the UE detects that the condition of the aforementioned mobility state has been satisfied. To enter a corresponding mobility state may mean that the UE determines that its own mobility state is the corresponding mobility state. In this case, if both the high mobility state condition and the medium mobility state condition are determined to be not satisfied during a specific time interval, the UE may enter the normal mobility state.

Positioning is described below.

A positioning function provides means for determining the geographical location and/or speed of UE based on the measurement of a radio signal. Location information may be requested by a client (e.g., an application) with which UE is combined or a client that is present in a core network or attached to the core network, and may be reported to the client. The location information is reported according to a standard format, and may be implemented based on a cell or as geographical coordinates along with the estimated error (uncertainty) of the location and speed of the UE and, if possible, a location method (or a list of methods) used to obtain location estimation.

Most of activated or deactivated UEs within a network may use a LoCation Service (LCS) characteristic without compromising the wireless transmission or signaling capabilities of an E-UTRAN.

The uncertainty of location information depends on a method used, the location of UE within a coverage area, and a movement of the UE. Various design options (e.g., the size of a cell, an adjustable antenna technology, path loss estimates, timing accuracy, and eNB surveys) of an E-UTRAN system enable a network operator to provide a UE positioning method that is suitable for the market and that is cost-effective.

Various use examples for positioning information are present. Positioning functions may be used by an EPS internally, value-added network services, UE itself, or third-party service over a network. The functions may also be used by essential or additional emergence services. Location service may not be exclusively assigned for the location service.

Positioning methods supported in an E-UTRAN may include a network-supported GNSS method, a downlink positioning method, an enhanced cell identity (ID) (E-CID) method, and an uplink positioning method. A hybrid positioning method to which one or more of the aforementioned methods are applied at the same time is also possible.

The network-supported GNSS method is based on UE equipped with a wireless receiver capable of receiving GNSS signals. The GNSS includes a Global Positioning System (GPS), Galileo, a global navigation satellite system (GLONASS), Space Based Augmentation Systems (SBAS), and a Quasi Zenith Satellite System (QZSS). In accordance with the network-supported GNSS method, different GNSSs may be individually used to determine the location of UE, or at least one system may be combined and used.

The downlink positioning method also called Observed Time Difference of Arrival (OTDOA) is based on the measured timing of downlink signals transmitted from a plurality of eNBs to UE. The UE measures the timing of the received signals using assistance data received from a positioning server. The measured result is used to determine the location of the UE in relation to neighboring eNBs.

In the cell identity (CID) positioning method, the location of UE is estimated based on the knowledge of the serving eNB and serving cell of the UE. Information about the serving eNB and the serving cell may be obtained by paging, the update of a tracking area, or other methods. The E-CID positioning method means a technology that uses measurements different from those of additional UE and/or E-UTRAN radio resources in order to improve UE location estimation.

Although the E-CID positioning method uses some identical measurement as in a measurement control system on the RRC protocol, UE is not expected to perform additional measurement for only positioning. For example, a separate measurement configuration or measurement control message is not provided for positioning, and the UE is not requested to take an additional measurement action, but reports its own valid measurement.

The uplink positioning method also called Uplink Time Difference OF Arrival (UTDOA) is based on measurement timing in a plurality of Location Measurement Units (LMUs) for an uplink signal transmitted by UE. The LMU measures signal reception timing using assistance data received from a positioning server, the measured result is used to estimate the location of UE.

Figure 13:
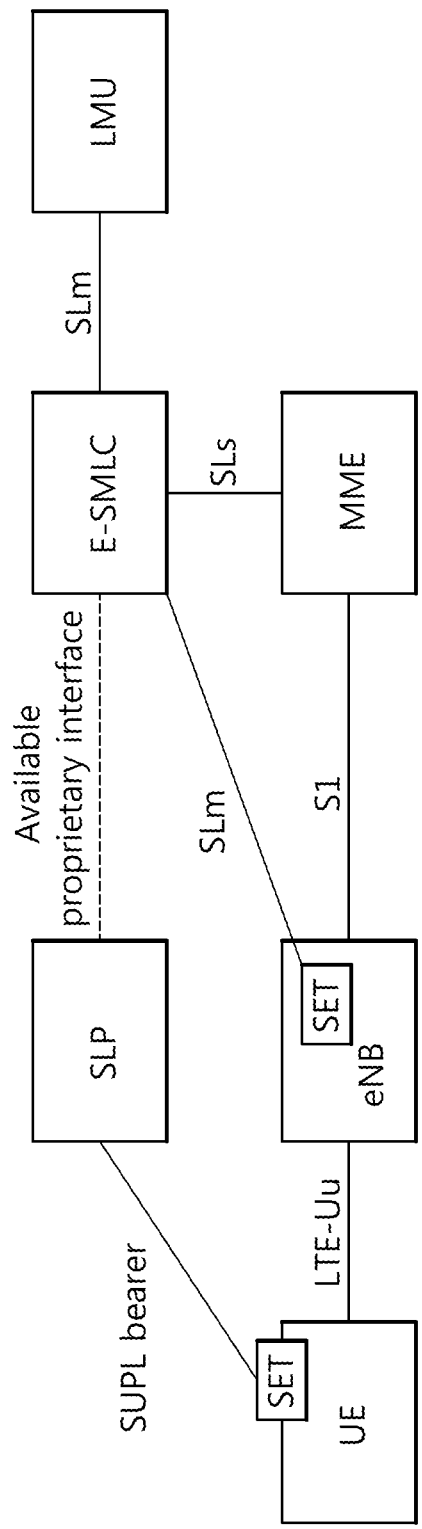
FIG. 13 is a diagram illustrating an example of the configuration of a wireless communication system to which the positioning of UE is applied in accordance with an embodiment of the present invention.

FIG. 13 is a diagram illustrating an example of the configuration of a wireless communication system to which the positioning of UE is applied in accordance with an embodiment of the present invention.

An MME may receive a request for location service related to a specific target UE from a specific entity (e.g., a Global Mobile Location Center (GMLC) or UE). Furthermore, for purposes, such as an IP Multimedia Subsystem (IMS) emergency call from a UE, the MME may determine to initiate location service for a specific target UE. Accordingly, the MME sends a location service request to an Evolved-Service Mobile Location Center (E-SMLC).

The E-SMLC processes the location service request. The E-SMLC may transfer assistance data to the target UE in order to help UE-based and/or UE support positioning. The E-SMLC may perform the positioning of the target UE. In processing location service according to an uplink method, the E-SMLC may transfer configuration data to selected Location Measurement Units (LMUs). Accordingly, the E-SMLC may return the results of the location service to the MME. Meanwhile, if the location service is requested by another entity (the UE or the E-SMLC) not the MME, the MME may return the results to a corresponding entity.

A SUPL Location Platform (SLP) is a Secure User Plane Location (SUPL) entity responsible for positioning on the user plane.

Location-related functions are provided in order to support the positioning of a target UE and the transfer of location assistance data to the UE. Such functions may be properly distributed within a structure, such as that of FIG. 13, and may be implemented. Meanwhile, reference to FIG. 14 may be made for operations related to location service that may be performed between such entities.

Figure 14:
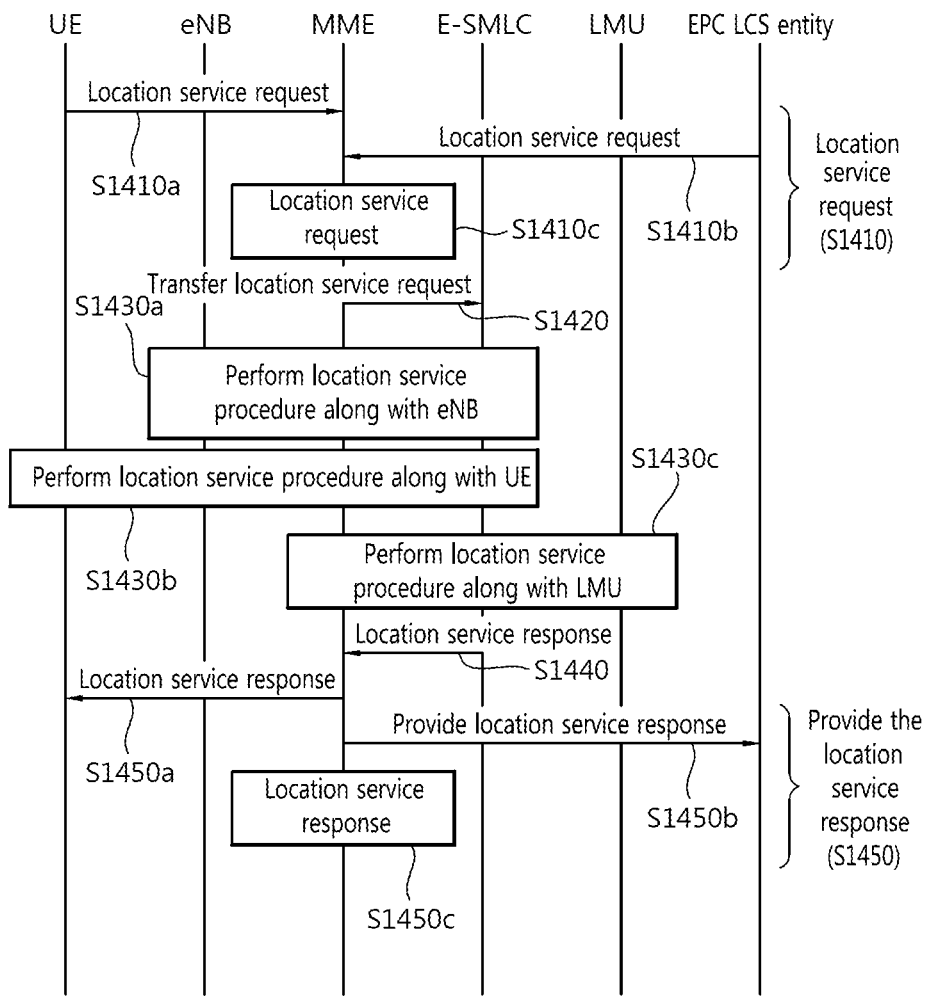
FIG. 14 is a diagram illustrating overall procedures for location service in accordance with an embodiment of the present invention.

FIG. 14 is a diagram illustrating overall procedures for location service in accordance with an embodiment of the present invention.

If an MME receives a location service request when UE is in the ECM-IDLE state, the MME establishes signaling connection with the UE, and performs a network triggering service request in order to assign a specific eNB. It is assumed that the UE enters a connection state before the overall procedures illustrated in FIG. 14 are started.

Location service is started in response to a location service request from a specific entity (S1410). The location service request may be started as follows.

The UE may request location service (e.g., positioning or the transfer of assistance data) from a serving MME on an NAS level (S1410*a*). A specific entity within an Evolved Packet Core (EPC), such as a GMLC, may request location service (e.g., positioning) for the target UE from the serving MME (S1410*b*). The serving MME for the target UE may determine whether or not the location service is necessary, and may autonomously request the location service if the location service is necessary (S1410*c*). This may be for placing the UE at a specific location or for an emergency call.

The MME transfers the location service request to an E-SMLC (S1420).

The E-SMLC performs a location service procedure in response to the location service request (S1430). The E-SMLC may perform the location service procedure along with the serving eNB of the UE (S1430a). This may include obtaining positioning measurement or assistance data. For downlink positioning, the E-SMLC may perform the location service procedure along with the UE (S1430b) along with S1430a or instead of S1430a. This may include obtaining location estimation or positioning measurement or transferring location assistance data to the UE. For uplink positioning (e.g., UTDOA), the E-SMLC may perform the location service procedure along with one or more LMUs for the target UE (S1430c) along with S1430a. This may include obtaining positioning measurement.

The E-SMLC provides the MME with a location service response (S1440). The location service response may include required results. For example, an indicator indicative of a success or failure and/or location estimation for the UE may be included.

The location service response is provided to the entity that has requested the location service (S1450). If the location service request is started by the UE as in S1410a, the MME may transfer the location service response to the UE (S1450a). In such a case, the location service response may include results that have been requested or are required like the location estimation of the UE. If the location service request is started by a specific entity within the EPC as in S1410b, the MME may transfer the location service response to the corresponding entity (S1450b). In such a case, the location service response may include results that have been requested or are required like the location estimation of the UE. If the location service request is autonomously started by the MME as in S1410c, the location service response received from the E-SMLC may be used for the location service (S1450c).

A positioning operation in a wireless communication system is described below.

Unlike in location service support for specific UEs, an E-SMLC may interact with elements within an E-UTRAN in order to obtain measurement information which supports one or more positioning methods for all UEs.

Support of a downlink positioning method: an E-SMLC may obtain location-related information in order to support a downlink positioning method. To this end, the E-SMLC may interact with an eNB accessible to the MME that has been signaling-connected to the E-SMLC. The location-related information may include an absolute GNSS time or timing information about the eNB related to the timing of other eNBs. Furthermore, the information may include information about supported cells, and may include a Positioning Reference Signal (PRS) schedule, for example. Signaling access between the E-SMLC and the eNB may be performed through the MME that maintains signaling access to the E-SMLC and the eNB.

Support of an uplink location method: the E-SMLC may interact with the serving eNB of a target UE in order to recover configuration information about the target UE for supporting an uplink positioning method. The configuration information may include information requested by an LMU in order to support uplink time measurement. The E-SMLC may inform the serving eNB that it is necessary to send an SRS signal to the UE for uplink positioning. If requested resources are not available, the eNB may assign other resources and reports the assigned resources to the E-SMLC. Furthermore, the E-SMLC may request the LMU to perform uplink time measurement and to report a measured result thereof.

The operations of entities related to UE positioning in a wireless communication system are described in detail below.

The UE may send a signal necessary for uplink-based UE location measurement. Furthermore, the UE may measure downlink signals from other resources, such as an E-UTRAN and other GNSS systems. A measurement method may be determined based on a selected positioning method.

The UE may include a location service application, or may access a location service application through communication with a network or another application included in the UE. The location service application includes a measurement and calculation function that is required to determine the location of the UE along with the support of a required network or without the support of a network.

For example, the UE may have an independent positioning function (e.g., GPS) and may report results thereof independently of the transmission of an E-UTRAN. The UE equipped with the independent positioning function may use support information obtained by a network.

The eNB is an element of an E-UTRAN that provides a measured result for location estimation, and may measure a radio signal for target UE and send the measurement to an E-SMLC. The eNB may perform measurement in response to a request, or may perform measurement and a report regularly or when a specific wireless state is changed. The eNB may configure the UE so that the UE sends a periodic SRS.

The E-SMLC manages the support of location service for target UE, and the management includes the positioning of the UE and the transfer of assistance data to the UE. The E-SMLC may interact with the serving eNB of the UE in order to obtain location measurement for the UE. The measurement includes uplink measurement by an eNB and downlink measurement by UE. From among them, the downlink measurement by the UE may be provided to an eNB through another function, such as the support of handover. In order to enable an uplink positioning method and for an LMU to obtain target UE configuration data required to compute the timing of a signal, the E-SMLC may interface with an eNB in order to instruct the serving eNB that the UE is required to send an SRS signal. The E-SMLC may select a set of LMUs used for UTDOA positioning. The E-SMLC may interact with selected LMUs in order to request timing measurement. If there is a request, the E-SMLC may interact with the target UE in order to transfer assistance data or obtain location estimation.

For the positioning of the target UE, the E-SMLC may determine a positioning method that will be used based on factors, including an LCS client type, required QoS, UE positioning capabilities, and the positioning capabilities of an eNB. Accordingly, the E-SMLC may apply the positioning method to the UE and/or the serving eNB. The positioning method includes location estimation for a UE-based positioning method and/or location measurement for a UE support and network-based positioning method. The E-SMLC may combine all received results, and may determine single location estimation for target UE. Supplementary information, such as the accuracy and speed of location estimation may also be determined.

An LMU performs measurements and transfers measured results to an E-SMLC. All the location measurements obtained by the LMU may be provided to the E-SMLC. A UE positioning request may be accompanied by measurements performed by a plurality of LMUs.

In network performance optimization, a network may collect a variety of types of measured results including the measurement of an air interface. For efficient network performance optimization based on an analysis of the collected measured results, it may be important for a network to check a precise location where the measured result was obtained.

From a viewpoint of UE, a point of time at which a measured result is obtained may be different from a point of time at which location information is obtained. In order to properly support network performance optimization, UE may be required to report location information having a high correlation with a measured result to a network. However, proper evaluation criteria that are defined for the UE to determine whether the location information has a high correlation with the measured result are not provided. This means that when the network obtains the location information from the UE, the network is unable to know whether the corresponding location information has a high correlation with the measured result. As a result, a problem in that network performance optimization is not efficiently performed may occur.

In order to supplement such a problem, the present invention proposes a method of also providing, by UE, a network with correlation validity information when reporting location information to the network so that the network can perform validity evaluation for determining whether the location information has a high correlation with a measured result.

In reporting the location information to network, the UE may send the location information and the correlation validity information to an eNB together. The location information may be location information obtained through positioning at a single specific point of time. The location information may include one or more pieces of location information obtained through positioning at least one point of time.

The correlation validity information may include information, that is, a basis on which the network determines a correlation. When the UE reports the location information, the network may indicate whether the location information has to be reported along with the correlation validity information. Such indication may be indicated when the network instructs the UE to report the location information. Such indication may be indicated when the network instructs the UE to report logged measurements.

The correlation validity information may include time information when the location information is obtained and time information when the measured results are obtained. The correlation validity information may be information about the speed of the UE when the location information is obtained and/or information about the speed of the UE when the measured results are obtained. The speed information may be an actual speed of the UE at a corresponding point of time. The speed information may be an estimated speed of the UE at a corresponding point of time.

The UE may include the measured result, the location information, and the validity information in a single report message and send the report message to an eNB. In contrast, the measured result and the location information may be included in respective report messages and transmitted. In such a case, the correlation validity information may be included in a report message including the location information.

The determination and validity evaluation of a correlation between the measured result and the location information may be performed by an eNB included in the network or a network entity (e.g., a TCE) that collects the measured result and the location information.

1) If Correlation Determination and Validity Evaluation are Performed by an eNB

An eNB that has obtained a measured result, location information, and correlation validity information from UE determines a correlation between the measured result and the location information and performs correlation validity evaluation. The eNB may forward the measured result and location information, having a high correlation with the measured result, to a collection network entity based on a result of the correlation validity evaluation. In forwarding the measured result and location information, the eNB may send identification information that identifies that the forwarded location information is associated with a specific measured result to the collection network entity. According to circumstances, the eNB may obtain measured results and pieces of location information from pieces of UE and transfer them to the collection network entity, or the eNB may forward the measured results and the pieces of location information to the collection network entity several times without transferring them to the collection network entity once. In such a case, corresponding information may be properly used for network performance optimization only when location information related to a measured result is identified. To this end, information that identifies the pairing of the measured result and the location information may be transmitted to the collection network entity. Incidentally, the eNB that performs the correlation validity evaluation and transfers the measured results and the pieces of correlated location information to the collection network entity may transfer information that identifies that the measured results and the location information are results to which the correlation validity evaluation has been applied.

2) If Correlation Determination and Validity Evaluation are Performed by a Collection Network Entity An eNB that has obtained a measured result, location information, and correlation validity information from UE may forward the measured result, the location information, and the correlation validity information to a collection network entity. In forwarding the measured result, the location information, and the correlation validity information, the eNB may send identification information that identifies that the forwarded location information has been associated with a specific measured result to the collection network entity. According to circumstances, the eNB may obtain measured results and pieces of location information from pieces of UE and transfer them to the collection network entity, or the eNB may forward the measured results and the pieces of location information to the collection network entity several times without transferring them to the collection network entity once. In such a case, corresponding information may be properly used for network performance optimization only when location information related to a measured result is identified. Incidentally, the eNB that performs the correlation validity evaluation and transfers the measured results and the pieces of correlated location information to the collection network entity may transfer information that identifies that the transferred measured results and location information are information to which the correlation validity evaluation has not yet been applied.

The collection network entity may determine a correlation the measured result and the location information based on the obtained correlation validity information and evaluate the validity of the determined correlation.

The network may efficiently perform network performance optimization based on the measured result and location information having a high correlation with the measured result.

The aforementioned method of determining and evaluating a correlation in accordance with an embodiment of the present invention is described in detail below.

A correlation between a measured result and location information may be differently determined depending on correlation validity information. If the correlation validity information includes time-related information, such as a point of time at which the measured result was obtained and a point of time at which the location information was obtained, the correlation may be determined to be the interval between the two points of time. In such a case, a result of correlation validity evaluation may be dependent on a time reference value. In contrast, if the correlation validity information further includes information about the speed of UE at each point of time along with the time-related information, the correlation may be determined to be the interval between the two points of time and/or a distance interval between the locations of UE between the two points of time. In such a case, the correlation validity evaluation may be dependent on a time reference value and/or a distance interval reference value.

A correlation between a measured result and location information may be a time interval between a point of time at which the measured result was obtained and a point of time at which the location information was obtained. A network may be aware of the point of time at which the measured result was obtained and the point of time at which the location information was obtained through correlation validity information. Meanwhile, there is a good possibility that the location of UE at a point of a time at which a measured result was obtained may be different from a location indicated by location information as a difference between a time interval when the measured result was obtained and a time interval when the location information was obtained is increased. Accordingly, a correlation between the measured result and the location information may be properly incorporated in the time interval.

A correlation between a measured result and location information may be a distance interval between the location of UE when the measured result was obtained and the location of the UE when the location information was obtained. The correlation defined as the distance interval may be determined only when speed information is additionally supplied by the UE through correlation validity information. The speed information may be indicative of an actual speed of the UE. The speed information may be indicative of an estimated mobility state of the UE. The mobility state may correspond to a specific speed value by a network, and the corresponding speed value may be used to determine the correlation. The speed information may be indicative of the specific speed value corresponding to the estimated mobility state of the UE. The specific speed value corresponding to the mobility state may be previously set in the UE or may be signaled by the network. In providing the correlation validity information, the UE may estimate the mobility state through MSE and include speed information indicative of a corresponding specific speed value in the correlation validity information.

The distance between two points of time may be calculated through time for the two points of time and a speed of UE, which may be determined as in the following equation.

$$D_{mp} = |T_m - T_p| \times v_p$$

In this case, $D_{mp}$ is a distance between the location of UE when a measured result was obtained and the location of the UE when location information is obtained.

$T_m$ is a time at a point of time at which the measured result was obtained.

$T_p$ is a time at a point of time at which the location information was obtained.

$v_p$ is a speed of the UE. The speed of the UE may be a speed of the UE at the point of time at which the measured result was obtained. The speed of the UE may be a speed of the UE at the point of time at which the location information was obtained. If UE is able to be aware of both a speed at a point of time at which a measured result was obtained and a speed at a point of time at which location information was obtained, a speed of the UE may be a specific value (e.g., an average value) of the two speeds.

A speed of UE may be a specific speed value corresponding to a mobility state. The specific speed value mapped to the mobility state may be implemented in the form of high mobility-60 km/s, middle mobility-40 km/s, and normal mobility-20 km/s, for example. The mapped specific value may be implemented to be greater as the mobility state is higher and to be smaller as the mobility state is lower.

A network may evaluate the validity of a determined correlation. In order to evaluate the correlation validity, a validity criterion may be applied. If the correlation is determined to be a time interval, the validity criterion for the evaluation may be a time interval criterion $T_{valid}$. The network may compare the absolute value of a difference between $T_m$, that is, a point of time at which a measured result was obtained, and $T_p$, that is, a point of time at which location information was obtained, with $T_{valid}$. If the absolute value of the difference is smaller than $T_{valid}$, the network may determine that a correlation between the measured result and the location information is high. In contrast, if the absolute value of the difference is greater than $T_{valid}$, the network may determine that a correlation between the measured result and the location information is low.

If the correlation is determined to be a distance, the validity criterion for the evaluation may be a distance interval criterion $D_{valid}$. The network may compare determined $D_{mp}$ with determined $D_{valid}$. If $D_{mp}$ is smaller than $D_{valid}$, the network may determine that a correlation between the measured result and the location information is high. In contrast, if $D_{mp}$ is greater than $D_{valid}$, the network may determine that a correlation between the measured result and the location information is low.

The network may perform the correlation validity evaluation on a time interval and a distance interval. In such a case, if the time interval is smaller than $T_{valid}$ and the distance interval is smaller than $D_{valid}$, the network may determine that a correlation between the measured result and the location information is high. In contrast, if any one of the time interval and the distance interval is greater than the criteria value, the network may determine that a correlation between the measured result and the location information is low.

In the aforementioned embodiment of the present invention, the measured result may be a result according to RRM measurements for a serving cell and/or a neighboring cell. The measured result may be a measured result of UE performance (e.g., delay, throughput, and QoS) on an air interface. The measured result may be a connection failure (e.g., a radio link problem/failure, handover, a handover failure, a connection configuration failure, or a random access failure) occurred in UE.

In the aforementioned embodiment of the present invention, the location information may be obtained using a GNSS apparatus. The location information may be obtained using an LTE Positioning Protocol (LPP). The location information may be obtained using an E-CID positioning method. The location information may be obtained using a SUPL method.

Figure 15:
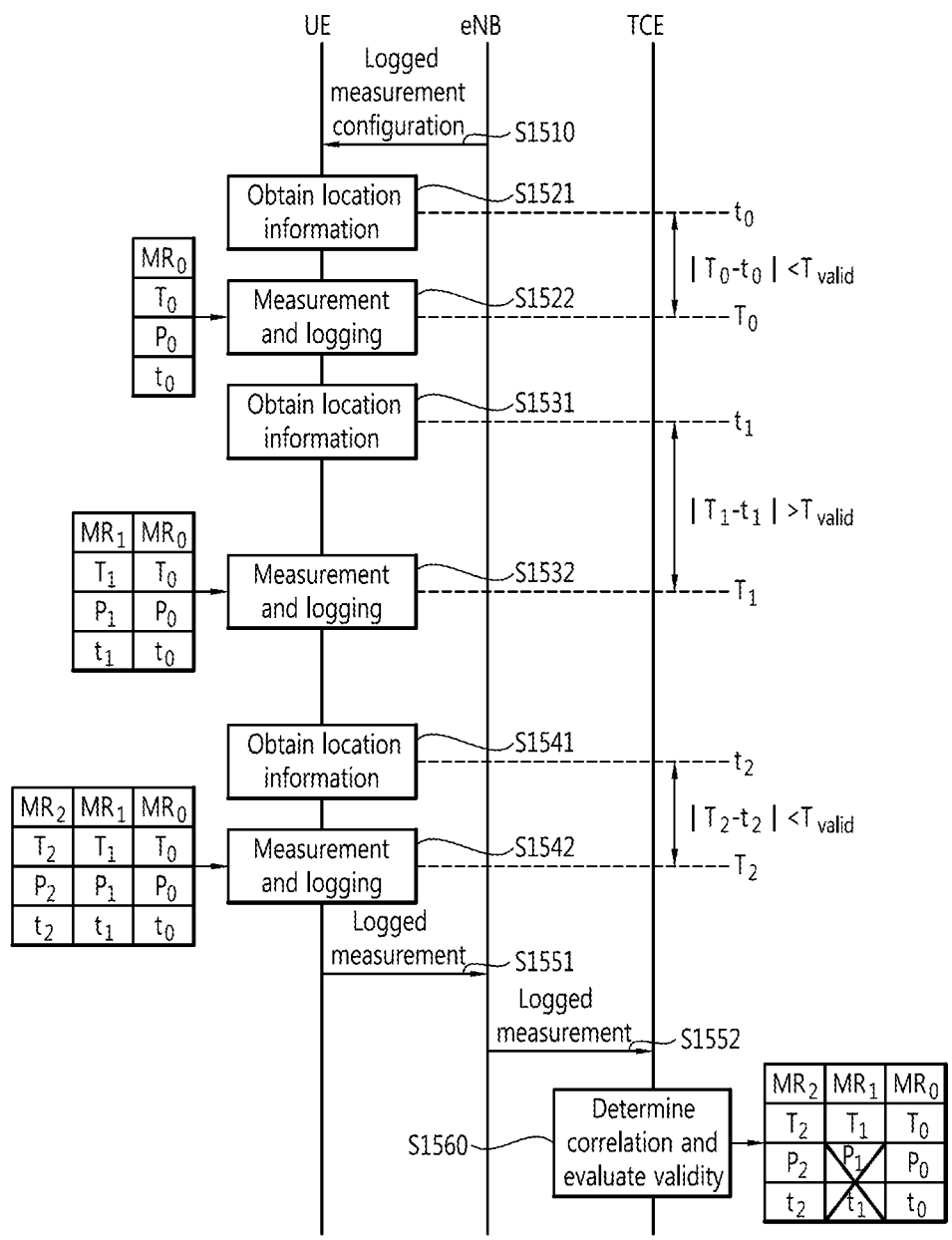
FIG. 15 is a diagram illustrating an example of a method of evaluating correlation validity in accordance with an embodiment of the present invention.

FIG. 15 is a diagram illustrating an example of a method of evaluating correlation validity in accordance with an embodiment of the present invention.

The example of FIG. 15 corresponds to a method of evaluating correlation validity based on logged measurements reported by UE that performs a logged MDT.

Referring to FIG. 15, the UE receives a logged measurement configuration from an eNB (S1510). The logged measurement configuration may include configuration information that is necessary for the UE to perform logged MDTs. When the UE receives the logged measurement configuration and enter RRC_IDLE mode, the UE may perform measurements and logging based on the logged measurement configuration.

The UE obtains location information $P_0$ at a point of time $t_0$ (S1521). The location information may be an actual geographical location of the UE or information necessary to check the actual geographical location of the UE through the aforementioned various positioning schemes. When obtaining the location information $P_0$, the UE may also store $t_0$, that is, the point of time at which the location information was obtained.

The UE obtains a measured result $MR_0$ through measurement at a point of time $T_0$ and logs the measured result $MR_0$ (S1522). When logging the measured result, the UE may also log the location information $P_0$ obtained within a recent logging interval. Furthermore, the UE may log $T_0$, that is, the measurement time information related to the measured result, and $t_0$ related to the location information together.

The UE obtains location information $P_1$ at a point of time $t_1$, that is, a specific point of time during a next logging interval (S1531). The location information may be an actual geographical location of the UE or information necessary to check the actual geographical location through the aforementioned various positioning schemes. When obtaining the location information $P_1$, the UE may also store $t_1$, that is, a point of time at which the location information was obtained.

The UE obtains measured result $MR_1$ at a point of time $T_1$ through measurement and logs the measured result $MR_1$ (S1532). When logging the measured result $MR_1$, the UE may also log the location information $P_1$ obtained within a recent logging interval. Furthermore, the UE may log $T_1$, that is, the measurement time information related to the measured result, and $t_1$ related to the location information together.

The UE obtains location information $P_2$ at a point of time $t_2$, that is, a specific point of time during a next logging interval (S1541). The location information may be an actual geographical location of the UE or information necessary to check the actual geographical location through the aforementioned various positioning schemes. When obtaining the location information $P_2$, the UE may also store $t_2$, that is, the point of time at which the location information was obtained.

The UE obtains a measured result $MR_2$ at a point of time $T_2$ through measurement and logs the measured result $MR_2$ (S1542). When logging the measured result, the UE may also log the location information $P_2$ obtained within a recent logging interval. Furthermore, the UE may log $T_2$, that is, the measurement time information related to the measured result, and $t_2$ related to the location information together.

When a report on the logged measurements is permitted, the UE reports the logged measurements to the eNB (S1551). The logged measurements include the pieces of measurement time information $t_0$, $t_1$, and $t_2$ and the pieces of location information acquisition time information $T_0$, $T_1$, and $T_2$ as logged measured results, logged location information, and correlation validity information.

The eNB may forward the logged measurements, obtained from the UE, to a TCE, that is, a collection network entity (S1552).

The TCE may determine a correlation between logged measured results and pieces of logged location information included in the logged measurement and evaluate the validity of the correlation (S1560). In performing the correlation determination and validity evaluation, the TCE may use the measurement time information and the correlation validity information.

The TCE may determine a correlation according to a time interval because it has been provided with time information, related to the measured result and the location information, as the correlation validity information. The TCE may determine a time interval $T_0$-$t_0$ that is a correlation between $MR_0$ and $P_0$, a time interval $T_1$-$t_1$ that is a correlation between $MR_1$ and $P_1$, and a time interval $T_2$-$t_2$ that is a correlation between $MR_2$ and $P_2$.

The TCE may perform correlation validity evaluation on the determined correlations. Since each of the time interval $T_0$-$t_0$ and the time interval $T_2$-$t_2$ is smaller than $T_{valid}$, the TCE may determine that $P_0$ has a high correlation with $MR_0$ and $P_2$ has a high correlation with $MR_2$. In contrast, since the time interval $T_1$-$t_1$ is greater than $T_{valid}$, the TCE may determine that $P_1$ has a low correlation with $MR_1$.

A network may perform the network performance optimization based on the remaining measured results and location information other than the location information $P_1$ based on a result of the correlation validity evaluation performed by the TCE. More efficient network performance optimization can be performed through such a method because location information having a low correlation with a measured result is excluded from logged measurement.

In FIG. 15, if the UE is able to measure a speed when obtaining the measured result and when obtaining the location information, the UE may also log a speed a corresponding point of time. In such a case, information about the speed is the correlation validity information, and the information may be transmitted to the eNB and forwarded to the TCE. The TCE may optionally determine a correlation in relation to a time interval and/or a distance interval and evaluate validity.

In FIG. 15, the correlation determination and validity evaluation have been performed by the TCE, but only information filtered based on correlation evaluation may be forwarded to the TCE after the correlation determination and validity evaluation are performed by the eNB. In such a case, a measured result and information that identifies location information related to the measured result may be additionally provided to the TCE.

Figure 16:
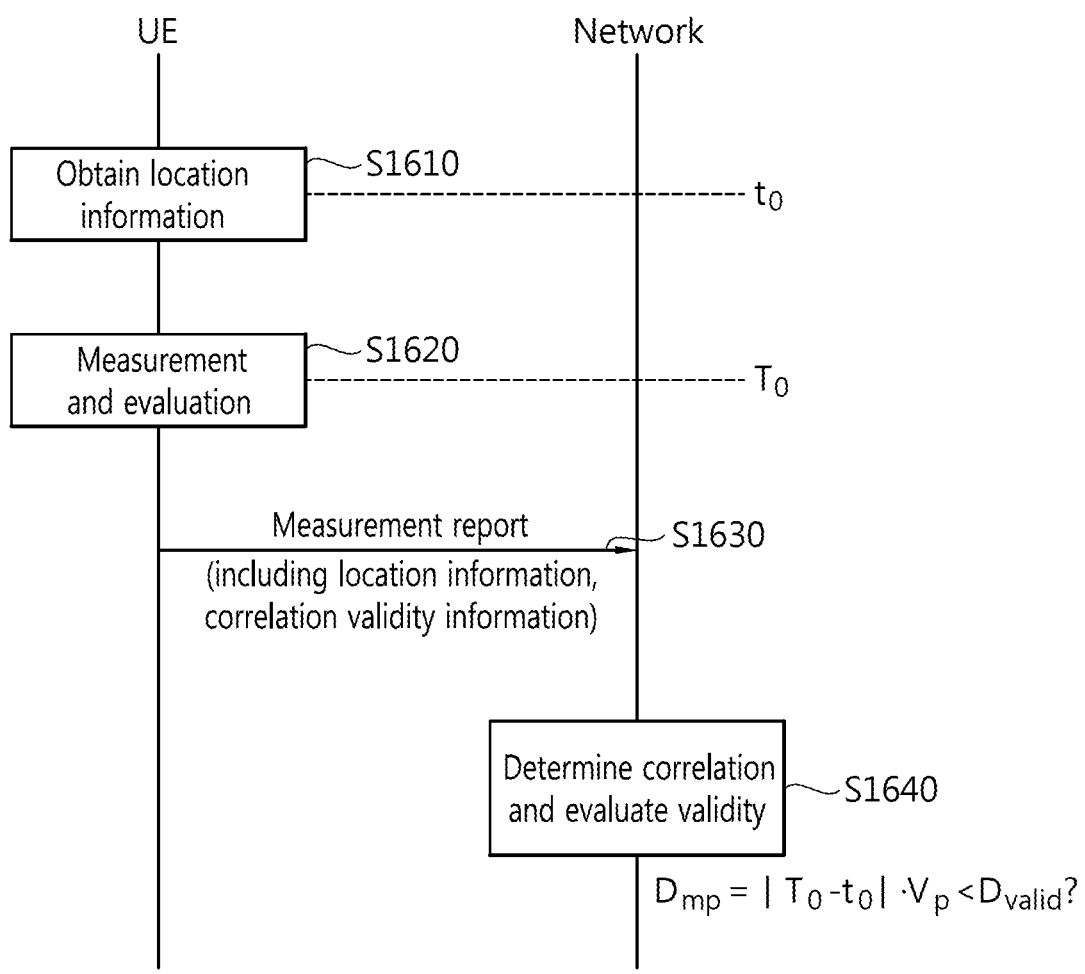
FIG. 16 is a diagram illustrating another example of a method of evaluating a correlation in accordance with an embodiment of the present invention.

FIG. 16 is a diagram illustrating another example of a method of evaluating a correlation in accordance with an embodiment of the present invention.

The example of FIG. 16 corresponds to a method of evaluating a correlation which is performed based on a measured result reported by UE that performs immediate MDTs.

Referring to FIG. 16, UE obtains location information $P_0$ at a point of time $t_0$ (S1610). The location information may be an actual geographical location of the UE or information necessary to check the actual geographical location through the aforementioned various positioning schemes. When obtaining the location information $P_0$, the UE may also obtain $t_0$, that is, the point of time at which the location information was obtained, and information about the speed of the UE $v_p(t_0)$ at a corresponding point of time.

The UE performs measurement and evaluation at a point of time $T_0$ (S1620). The UE may obtain the point of time $T_0$ at which a measured result is obtained and the information about a speed of the UE $v_p(T_0)$ at a corresponding point of time along with the measured result.

The UE checks that report conditions have been satisfied based on the obtained measured result $MR_0$ and may send a measurement report message to a network (S1630). The measurement report message may include the point of time $T_0$ at which the measured result was obtained, the point of time $t_0$ at which the location information was obtained, and the information about the speed of the UE $v_p(t_0)$ and $v_p(T_0)$ as the measured result $P_0$, the location information $P_0$, and correlation validity information. The information about the speed of the UE may be an actual speed of the UE at a corresponding point of time. The information about the speed of the UE may be indicative of an estimated mobility state of the UE at a corresponding point of time. The information about the speed of the UE may be a specific speed value mapped to an estimated mobility state at a corresponding point of time.

The network may determine a correlation between the measured result and the location information included in the measurement report message and evaluate the validity of the correlation (S1640). The network may use correlation validity information in performing the correlation determination and validity evaluation.

The network may determine a correlation according to a time interval and a distance interval because it has been provided with time information related to the acquisition of the measured result and the acquisition of the location information and with speed information at a corresponding point of time as correlation validity information. The present example illustrates that a correlation according to a distance interval is determined.

The network calculates a distance interval $D_{mp}$ between $T_0$-$t_0$, that is, a correlation between the measured result $MR_0$ and the location information $P_0$, using the time information and the speed information. $D_{mp}$ may be a value obtained by multiplying the absolute value of the time interval $T_0$-$t_0$ by the speed $v_p$ of the UE. If $v_p(t_0)$ and $v_p(T_0)$ are speed values, $v_p$ may be any one of the two values. If $v_p(t_0)$ and $v_p(T_0)$ are speed values, $v_p$ may be a specific value (e.g., an average value) of the two speed values. If $v_p(t_0)$ and $v_p(T_0)$ are estimated mobility states of the UE at corresponding points of time, the network may consider a previous specific value to be $v_p$ based on a speed corresponding to a corresponding mobility state.

The network may perform correlation validity evaluation on the determined correlation. The UE may compare $D_{mp}$ with $D_{valid}$ in order to evaluate correlation validity because the correlation for the distance interval has been determined. If $D_{mp}$ is smaller than the UE may determine that the location information has a high correlation with the measured result. If not, the UE may determine that the location information has a low correlation with the measured result.

The network may perform network performance optimization based on a result of the correlation evaluation.

Figure 17:
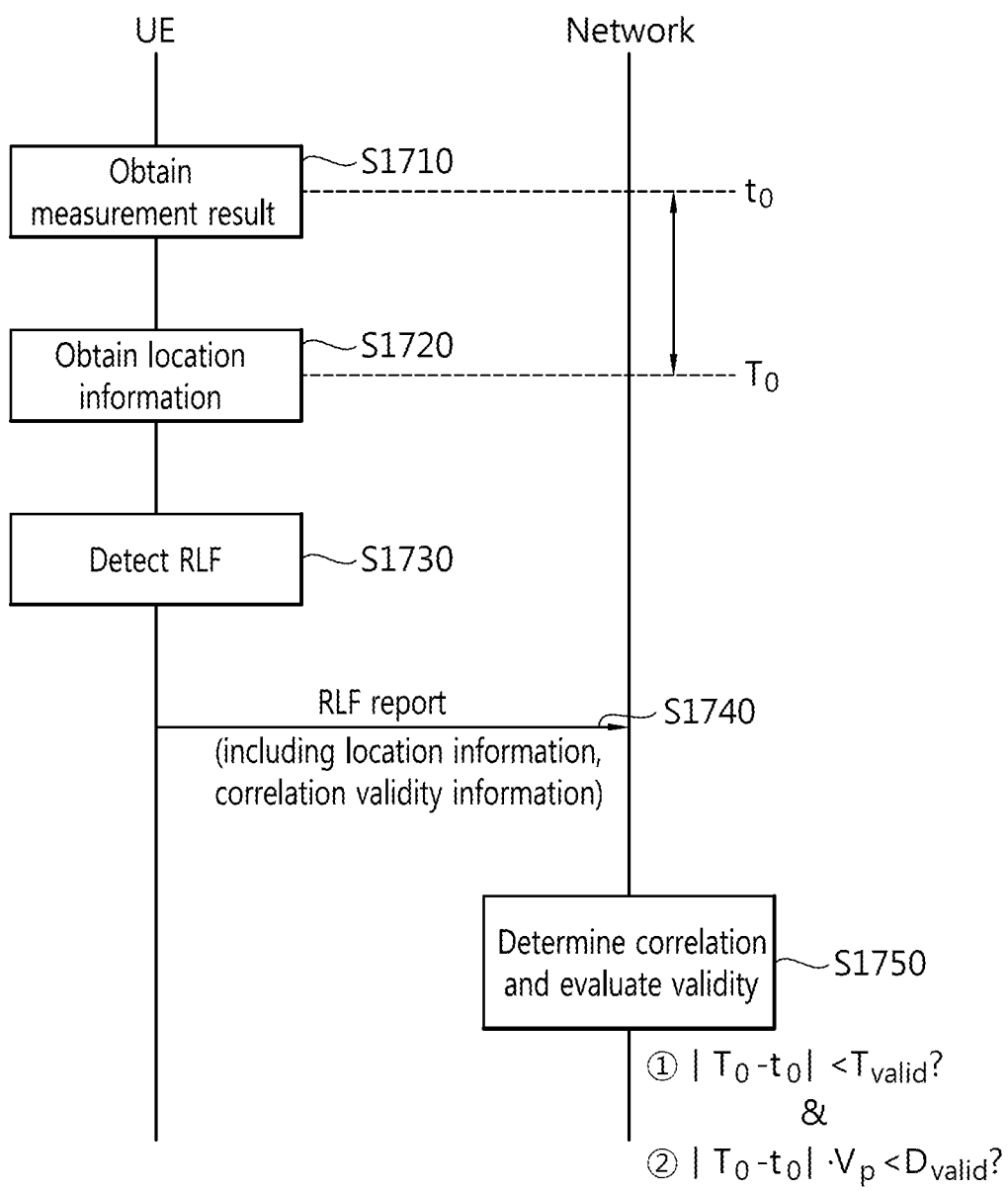
FIG. 17 is a diagram illustrating yet another example of a method of evaluating correlation validity in accordance with an embodiment of the present invention.

FIG. 17 is a diagram illustrating yet another example of a method of evaluating correlation validity in accordance with an embodiment of the present invention.

The example of FIG. 17 corresponds to a method of evaluating correlation validity which is performed based on an RLF report.

Referring to FIG. 17, UE obtains a measured result $MR_0$ at a point of time $t_0$ (S1710) and obtains location information $P_0$ at a point of time $T_0$ (S1720). The location information may be an actual geographical location of the UE or information necessary to check the actual geographical location through the aforementioned various positioning schemes. The UE may obtain $t_0$, that is, the point of time at which the measured result was obtained, and information about a speed of the UE $v_p(t_0)$ at the corresponding point of time together. The UE may obtain $T_0$, that is, the point of time at which the location information was obtained, and information about the speed of the UE $v_p(T_0)$ at the corresponding point of time together.

The UE detects that an RLF has occurred (S1730) and sends an RLF report message to a network (S1740). The RLF report message may include the measured result $MR_0$ and the location information $P_0$. The RLF report message may include the point of time $T_0$ at which the location information was obtained and the information about the speeds of the UE $v_p(t_0)$ and $v_p(T_0)$ as the measurement time information $t_0$ and correlation validity information. The information about the speed of the UE may be indicative of an actual speed of the UE at a corresponding point of time. The information about the speed of the UE may be indicative of an estimated mobility state of the UE at a corresponding point of time. The information about the speed of the UE may be a specific speed value mapped to an estimated mobility state at a corresponding point of time.

The network may determine a correlation between the measured result and the location information included in the RLF report message and evaluate the validity of the correlation (S1750). The network may use the correlation validity information in performing the correlation determination and validity evaluation.

The network may determine a correlation according to a time interval and a correlation according to a distance interval because it has been provided with time information related to the acquisition of the measured result and to the acquisition of the location information and the speed information at a corresponding point of time as the correlation validity information. The present example illustrates that the network determines both a correlation according to a time interval and a correlation according to a distance interval.

The correlation according to the time interval may be determined to be a time interval $T_0$-$T_1$.

The network determines a distance interval $D_{mp}$ between $T_0$-$t_0$, that is, a distance interval correlation between the measured result $MR_0$ and the location information $P_0$. $D_{mp}$ may be a value obtained by multiplying the absolute value of the time interval $T_0$-$t_0$ by the speed $v_p$ of the UE. If $v_p(t_0)$ and $v_p(T_0)$ are speed values, $v_p$ may be any one of the two values. If $v_p(t_0)$ and $v_p(T_0)$ are speed values, $v_p$ may be a specific value (e.g., an average value) of the two speed values. If $v_p(t_0)$ and $v_p(T_0)$ are estimated mobility states of the UE at corresponding points of time, the network may consider a previous specific value to be $v_p$ based on a speed corresponding to a corresponding mobility state.

The network may evaluate correlation validity on the determined correlations. In the present example, the network may evaluate correlation validity by comparing the time interval $T_0$-$t_0$ with $T_{valid}$ and comparing $D_{mp}$ with $D_{valid}$. If the time interval $T_0$-$t_0$ is smaller than $T_{valid}$ and the distance interval $D_{mp}$ is smaller than $D_{valid}$ based on the correlation for the time interval and the validity evaluation for the distance interval, the UE may determine that the location information P0 has a high correlation with the measured result $MR_0$. If not, the UE may determine that the location information $P_0$ has a low correlation with the measured result $MR_0$.

The network may perform network performance optimization based on a result of the correlation validity evaluation.

In an embodiment of the present invention, a network determines whether obtained location information has a high correlation with a measured result. More efficient network performance optimization can be performed because the network can optionally obtain location information that may be properly used for network performance optimization and location information having a low correlation is excluded.

Figure 18:
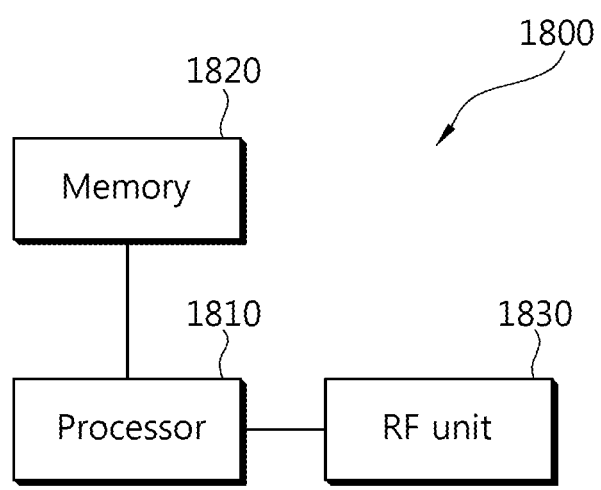
FIG. 18 is a block diagram illustrating a wireless apparatus in which an embodiment of the present invention is implemented.

FIG. 18 is a block diagram illustrating a wireless apparatus in which an embodiment of the present invention is implemented. The apparatus may be configured to perform the methods of evaluating a correlation between a measured result and location information, which have been described with reference to FIGS. 15 to 17 in accordance with embodiments of the present invention.

The wireless apparatus 1800 may be implemented using UE, an eNB, and a collection network entity that perform the methods of evaluating a correlation in accordance with an embodiment of the present invention.

The wireless apparatus 1800 includes a processor 1810, memory 1820, and a Radio Frequency (RF) unit 1830. The processor 1810 implements the proposed functions, processes and/or methods. The processor 1810 may be configured to perform the determination and evaluation of a correlation between a measured result and location information. The processor 1810 may be configured to report a measured result and location information to a network along with correlation validity information for correlation validity evaluation. The processor 1810 may be configured to determine a correlation between the measured result and the location information based on the obtained measured result and location information and the correlation validity information. The processor 1810 may be configured to perform the correlation validity evaluation based on the determined correlation and the correlation validity information. The processor 1810 may be configured to perform network performance optimization based on a result of the evaluation. The processor 1810 may be configured to perform the embodiments of the present invention described above with reference to FIGS. 15 to 17.

The RF unit 1830 is connected to the processor 1810 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for evaluating correlation validity between a measured result and location information which is performed by a network entity in a wireless communication system, the method comprising:

receiving, by the network entity, a measured result at a first point of time from a user equipment;

receiving, by the network entity, location information at a second point of time from the user equipment;

obtaining, by the network entity, correlation validity information for determining a correlation and evaluating correlation validity;

determining, by the network entity, the correlation between the location information and the measured result; and performing, by the network entity, the correlation validity evaluation for determining whether the location information has a high correlation with the measured result based on the correlation, wherein both the measured result and the location information are used for network performance optimization by the network entity when the location information is determined to have a high correlation with the measured result based on the correlation validity evaluation, wherein the measured result is used for the network performance optimization by the network entity when the location information is determined to have a low correlation with the measured result based on the correlation validity evaluation, wherein the correlation validity information comprises time information at the first point of time, information about a speed of the user equipment at the first point of time, time information at the second point of time and information about a speed of the user equipment at the second point of time, wherein the correlation is determined by calculating a distance interval between a location of the user equipment at the first point of time and a location of the user equipment at the second point of time as the correlation, and the distance interval is calculated as $D_{mp}=|T_m-T_p| \times v_p$, and wherein $D_{mp}$ is the distance interval, $T_m$ is the first point of time, $T_p$ is the second point of time, and $v_p$ is a speed of the user equipment.

2. The method of claim 1, wherein the correlation is determined by calculating a time interval between the first point of time and the second point of time as the correlation.

3. The method of claim 2, wherein evaluating, by the network entity, the correlation validity comprises:

comparing the time interval with a specific time reference value; and determining the location information to have a high correlation with the measured result if the time interval is smaller than the specific time reference value.

4. The method of claim 1, wherein evaluating, by the network entity, the correlation validity comprises:
comparing the distance interval with a specific distance reference value; and
determining the location information to have a high correlation with the measured result if the distance interval is smaller than the distance reference value.

5. The method of claim 4, wherein the speed is a speed of the user equipment measured at the first point of time.

6. The method of claim 4, wherein the speed is a speed of the user equipment measured at the second point of time.

7. The method of claim 4, wherein the speed is an average value of a speed of the user equipment measured at the first point of time and a speed of the user equipment measured at the second point of time.

8. The method of claim 4, wherein the speed is set as a specific speed value corresponding to an estimated mobility state of the user equipment.

9. The method of claim 1, wherein the correlation validity information is obtained when the correlation validity information is transmitted to the network entity in response to an instruction of the network entity which instructs the correlation validity information to be reported.

10. The method of claim 1, further comprising:
forwarding, by the network entity, the measured result and the location information having a high correlation with the measured result to a collection network entity which collects the measured result and the location information having a high correlation with the measured result.

11. A wireless apparatus operating in a wireless communication system, the wireless apparatus comprising:
a radio frequency (RF) unit configured to transmit and receive radio signals; and
a processor operating in conjunction with the RF unit functionally,
wherein the processor is configured to:
receive a measured result from a user equipment at a first point of time via the RF unit;
receive location information from the user equipment at a second point of time via the RF unit;
obtain correlation validity information for determining a correlation and evaluating correlation validity;
determine the correlation between the location information and the measured result; and
perform the correlation validity evaluation for determining whether the location information has a high correlation with the measured result based on the correlation,
wherein both the measured result and the location information are used for network performance optimization by the processor when the location information is determined to have a high correlation with the measured result based on the correlation validity evaluation,
wherein the measured result is used for the network performance optimization by the processor when the location information is determined to have a low correlation with the measured result based on the correlation validity evaluation,
wherein the correlation validity information comprises time information at the first point of time, information about a speed of the user equipment at the first point of time, time information at the second point of time and information about a speed of the user equipment at the second point of time,
wherein the correlation is determined by calculating a distance interval between a location at the first point of time and a location at the second point of time as the correlation, and the distance interval is calculated as $D_{mp}=|T_m-T_p|\times v_p$, and
wherein $D_{mp}$ is the distance interval, $T_m$ is the first point of time, $T_p$ is the second point of time, and $v_p$ peed of the user equipment.

12. The wireless apparatus of claim 11, wherein the correlation is determined by calculating a time interval between the first point of time and the second point of time as the correlation.

13. The wireless apparatus of claim 12, wherein the correlation validity is evaluated by comparing the time interval with a specific time reference value and determining the location information to have a high correlation with the measured result if the time interval is smaller than the specific time reference value.

* * * * *